United States Patent [19]
Kuroyanagi et al.

[11] Patent Number: 5,493,364
[45] Date of Patent: Feb. 20, 1996

[54] EQUIPMENT CONTROL APPARATUS HAVING MEANS TO COMMUNICATE WITH A CENTRALIZED CONTROL APPARATUS

[75] Inventors: Satoshi Kuroyanagi, Tokyo; Masanori Miyata, Yokohama; Hideki Adachi; Shinichi Nakamura, both of Kawasaki; Naoyuki Ohki; Tokuharu Kaneko, both of Yokohama; Hiroshi Ozaki, Tokyo; Hisatsugu Tahara; Satoshi Kaneko, both of Kawasaki; Taisei Fukada, Tokyo; Mitsuharu Takizawa, Fuchu, all of Japan

[73] Assignee: Canon Kabushiki Kaisha, Tokyo, Japan

[21] Appl. No.: 264,054

[22] Filed: Jun. 22, 1994

Related U.S. Application Data

[62] Division of Ser. No. 112,318, Aug. 27, 1993, Pat. No. 5,359,391, which is a continuation of Ser. No. 869,185, Apr. 16, 1992.

[30] Foreign Application Priority Data

| Apr. 18, 1991 | [JP] | Japan | 3-85609 |
| Apr. 18, 1991 | [JP] | Japan | 3-85613 |
| Apr. 18, 1991 | [JP] | Japan | 3-85616 |
| Apr. 18, 1991 | [JP] | Japan | 3-85619 |
| Apr. 18, 1991 | [JP] | Japan | 3-85620 |
| Apr. 18, 1991 | [JP] | Japan | 3-85621 |
| Apr. 18, 1991 | [JP] | Japan | 3-85622 |
| Apr. 18, 1991 | [JP] | Japan | 3-85623 |

[51] Int. Cl.[6] ............................................. G03G 21/00
[52] U.S. Cl. ............................ 355/202; 355/204; 355/208
[58] Field of Search .................................. 355/200, 202, 355/204, 203, 205, 206, 207, 208, 209; 358/296, 300, 407; 371/16.4, 29.1

[56] References Cited

U.S. PATENT DOCUMENTS

| 3,305,839 | 2/1967 | Looschen et al. | 340/172.5 |
| 3,623,013 | 11/1971 | Perkins et al. | 340/172.5 |
| 3,638,191 | 1/1972 | Mann | 340/163 |
| 3,656,145 | 4/1972 | Proops | 340/310 |
| 3,842,408 | 10/1974 | Wells | 340/216 |
| 3,858,181 | 12/1974 | Goldsby et al. | 340/150 |
| 3,916,177 | 10/1975 | Greenwald | 235/153 |
| 3,984,032 | 10/1976 | Hyde et al. | 222/26 |
| 3,997,873 | 12/1976 | Thornton | 340/149 R |

(List continued on next page.)

FOREIGN PATENT DOCUMENTS

| 0121332 | 10/1984 | European Pat. Off. . |
| 0342910 | 11/1989 | European Pat. Off. . |
| 56-027161 | 3/1981 | Japan . |
| 59-022475 | 2/1984 | Japan . |
| 59-091456 | 5/1984 | Japan . |
| 59-081656 | 5/1984 | Japan . |
| 59-089067 | 5/1984 | Japan . |
| 59-116761 | 7/1984 | Japan . |
| 60-101664 | 6/1985 | Japan . |
| 60-230167 | 11/1985 | Japan . |
| 62-084653 | 4/1987 | Japan . |
| 63-122349 | 5/1988 | Japan . |

OTHER PUBLICATIONS

Xerox 1090 Copier Electronic Data Interface Operator Guide.
Kodak Ektaprint Brochure, "Kodak Telassistance Network", Copyright, Eastman Kodak Company, 19896.

*Primary Examiner*—Sandra L. Brasé
*Attorney, Agent, or Firm*—Fitzpatrick, Cella, Harper & Scinto

[57] ABSTRACT

An equipment controlling apparatus is composed of a counter for counting the operational number of the equipment, memories for storing data indicating the state of the equipment, a communication device for communicating on the stored data with a centralized control apparatus, which controls the communicated data intensively, and a controlling device for causing the stored data to be transmitted to the centralized control apparatus when the counter has counted a predetermined value.

39 Claims, 34 Drawing Sheets

U.S. PATENT DOCUMENTS

| | | | |
|---|---|---|---|
| 4,071,911 | 1/1978 | Mazur | 364/900 |
| 4,124,887 | 11/1978 | Johnson et al. | 364/107 |
| 4,144,550 | 3/1979 | Donohue et al. | 364/107 |
| 4,167,322 | 9/1979 | Yano et al. | |
| 4,188,668 | 2/1980 | Finlay | 364/900 |
| 4,199,100 | 4/1980 | Wostl et al. | 235/381 |
| 4,283,709 | 8/1981 | Lucero et al. | 340/147 R |
| 4,290,138 | 9/1981 | Bare et al. | 371/29 |
| 4,300,040 | 11/1981 | Gould et al. | 235/381 |
| 4,311,986 | 1/1982 | Yee | 340/825.63 |
| 4,312,066 | 1/1982 | Bantz et al. | 371/16 |
| 4,314,334 | 2/1982 | Daughton et al. | 364/200 |
| 4,358,756 | 11/1982 | Morel et al. | 340/539 |
| 4,369,442 | 1/1983 | Werth et al. | 340/825.35 |
| 4,432,090 | 2/1984 | da Silva | 371/32 |
| 4,455,453 | 6/1984 | Parasekvakos et al. | 179/2 AM |
| 4,456,790 | 6/1984 | Soyack | 179/18 ES |
| 4,477,901 | 10/1984 | Braband et al. | 371/15 |
| 4,496,237 | 1/1985 | Schron . | |
| 4,497,037 | 1/1985 | Kato et al. | 364/900 |
| 4,501,485 | 2/1985 | Tsudaka . | |
| 4,506,974 | 3/1985 | Sugiura et al. . | |
| 4,509,851 | 4/1985 | Ippolito et al. . | |
| 4,510,491 | 4/1985 | Prato | 340/792 |
| 4,523,299 | 6/1985 | Donohue et al. | 364/900 |
| 4,545,013 | 10/1985 | Lyon et al. | 364/200 |
| 4,549,044 | 10/1985 | Durham | 179/5 R |
| 4,574,283 | 3/1986 | Arakawa et al. | 340/825.08 |
| 4,578,538 | 3/1986 | Pascucci et al. | 179/2 DP |
| 4,583,834 | 4/1986 | Seko et al. . | |
| 4,595,921 | 6/1986 | Wang et al. | 340/825.08 |
| 4,611,205 | 9/1986 | Eglise | 340/825.35 |
| 4,630,042 | 12/1986 | Kawasaki et al. | 340/825.35 |
| 4,633,412 | 12/1986 | Ebert, Jr. et al. | 364/493 |
| 4,634,258 | 1/1987 | Tanaka et al. . | |
| 4,639,889 | 1/1987 | Matsumoto et al. | 364/900 |
| 4,652,698 | 3/1987 | Hale et al. | 380/24 |
| 4,654,800 | 3/1987 | Hayashi et al. | 364/479 |
| 4,658,243 | 4/1987 | Kimura et al. | 340/505 |
| 4,708,469 | 11/1987 | Bober et al. | 355/77 |
| 4,709,149 | 11/1987 | Takahashi et al. | 250/317.1 |
| 4,712,213 | 12/1987 | Warwick et al. | 371/15 |
| 4,723,212 | 2/1988 | Mindrum et al. | 364/401 |
| 4,742,483 | 5/1988 | Morrell | 364/900 |
| 4,745,602 | 5/1988 | Morrell | 371/20 |
| 4,751,484 | 6/1988 | Matsumoto et al. | 355/207 |
| 4,752,950 | 6/1988 | Le Carpentier | 379/106 |
| 4,760,330 | 7/1988 | Lias, Jr. | 324/73 R |
| 4,766,548 | 8/1988 | Cedrone et al. | 364/479 |
| 4,823,343 | 4/1989 | Takahashi | 371/16 |
| 4,845,483 | 7/1989 | Negishi | 340/825.16 |
| 4,870,459 | 9/1989 | Ito et al. | 355/209 |
| 4,876,606 | 10/1989 | Banno et al. | 358/434 |
| 4,916,607 | 4/1990 | Teraichi et al. | 364/200 |
| 4,935,955 | 6/1990 | Neudorfer | 358/407 X |
| 4,947,397 | 8/1990 | Sobel et al. | 371/16.4 |
| 4,952,975 | 8/1990 | Ito et al. | 355/206 |
| 4,962,368 | 10/1990 | Dobrzanski et al. | 340/514 |
| 4,991,114 | 2/1991 | Kawamura et al. | 364/519 |
| 5,077,582 | 12/1991 | Kravette et al. | 355/206 |
| 5,084,875 | 1/1992 | Weinberger et al. | 371/291 |
| 5,214,772 | 5/1993 | Weinberger et al. | 395/575 |
| 5,293,196 | 3/1994 | Kaneko et al. | 355/200 |
| 5,300,980 | 4/1994 | Maekawa et al. | 355/204 |

FIG. 15

| OCCURRENCE DATE | AT OCCURRENCE COUNTER VALUE | CODE |
|---|---|---|
| 1990　06　26 | 3450 | E001 |
| 1990　06　27 | 5201 | E001 |
| ⋮ | ⋮ | ⋮ |

F I G.17

| OCCURRENCE DATE | AT OCCURRENCE COUNTER VALUE | CODE |
|---|---|---|
| 1990 06 28 | 3450 | J 001 |
| 1990 06 29 | 5201 | J 001 |
| ⋮ | ⋮ | ⋮ |

F I G. 19

| TRANSMISSION DATE | TRANSMISSION TYPE CODE | RESULT |
|---|---|---|
| 1990 06 28 | 1 | 0 |
| 1990 06 29 | 2 | 0 |
| | . . . | |

FIG. 21

| ADDRESS | CONTENT |
|---|---|
| 0000H | TRANSFER DATA HEADER PORTION |
| 0100H (FIXED) | COMMON DATA |
| 0500H | DATA PECULIAR TO EACH COPYING MACHINE |

FIG. 22
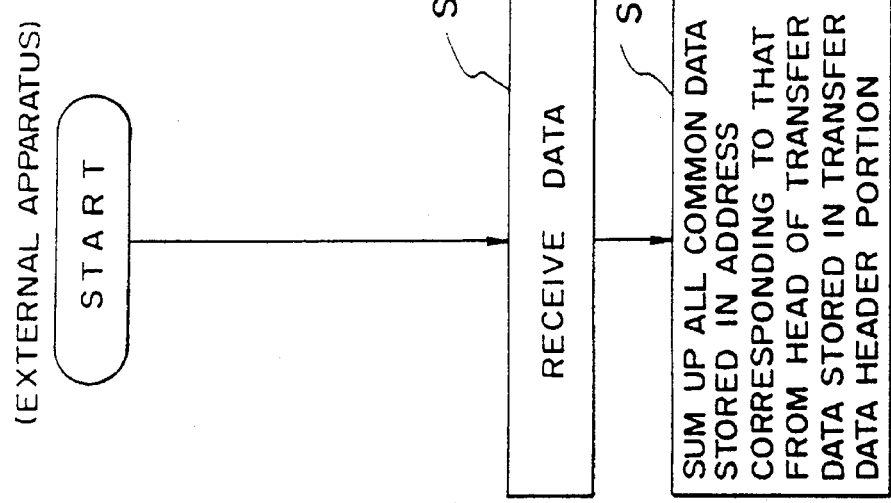
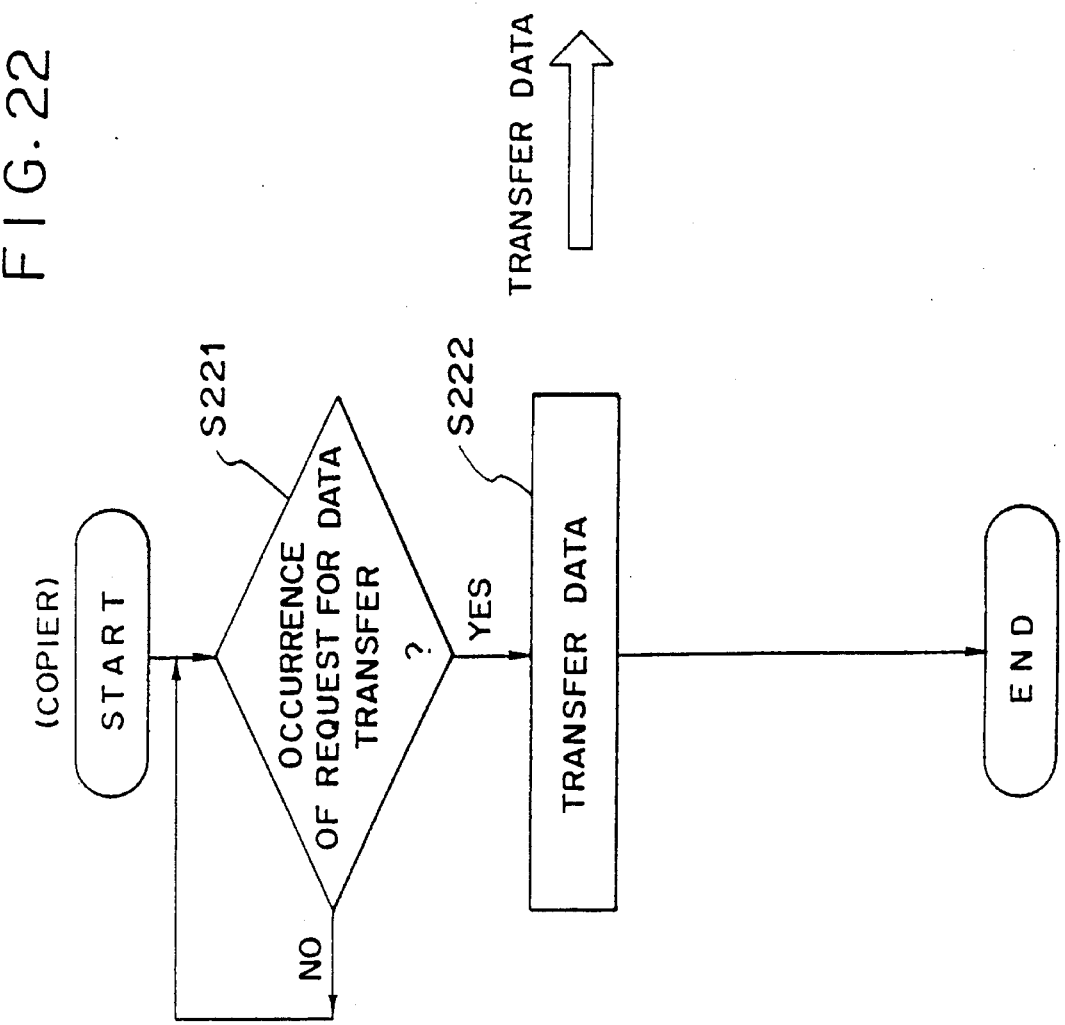

FIG. 23

| ADDRESS | CONTENT |
|---|---|
| 0000H | TRANSFER DATA HEADER PORTION INCLUDING ADDRESSES OF TRANSFER DATA AND SPECIAL DATA |
| 0100H (COMMON DATA ADDRESS) | COMMON DATA |
| 0500H (SPECIAL DATA ADDRESS) | DATA PECULIAR TO EACH COPYING MACHINE |

EQUIPMENT CONTROL APPARATUS HAVING MEANS TO COMMUNICATE WITH A CENTRALIZED CONTROL APPARATUS

This application is a division of application Ser. No. 08/112,318, filed Aug. 27, 1993, now U.S. Pat. No. 5,359,391, which in turn was a continuation of application Ser. No. 07/869,185, filed Apr. 16, 1992.

BACKGROUND OF THE INVENTION

1. Field of the Invention

The present invention relates to an equipment control apparatus for performing a centralized control of the conditions of a plurality of equipment by communications.

2. Related Background Art

With strong demands on the additional provisions of various functions and upgrading for copying machines, the structure and functions of the copying machines have become increasingly complicated. Also, the number of copying machines installed in one organization is on the increase, necessitating not only operational management but also the implementation of centralized equipment control by an operation control section of such an organization or by an outside specialist. The centrallized control would use a collection of the operational conditions and data of the copying machines in use for carrying out appropriate maintenance, prompt repairs and other related operations.

There has been known to this end, a copying machine, such as disclosed in U.S. Pat. No. 5,084,875, which is structured with storing means for storing the current operating conditions of the copying machine, control data or the like. The copying machine also has communication controlling means for communicating with an external apparatus on its current operational conditions, control data to collect the conditions thereof, data of its functions, and the like when the external apparatus installed in an administrative department or some other location is operated.

However, it is still necessary to save the data periodically data until a transmission instruction is received from the external apparatus or until a predetermined transmission setting time is reached. This is true even if any data, which should be transmitted immediately, takes place on the copying machine side. As a result, the information collection on the side of the external apparatus is delayed, leading to the problem of an eventual delay in taking the appropriate measures. Also, the required timing for transmission to the external apparatus differs, depending on the kinds of data.

Also, if the periodical data transmission time is reached or a data transmission demand occurs from the operation control section or the like while a copying operation is still in control, then it is necessary for the control means to execute both the copying control of image formation and the stored data transfer transmission control simultaneously. As a result, the control processing items should be increased, resulting in a slower processing speed and a longer occupation of the external communication lines. Hence unavoidably creating the problems that not only are other communications hindered but that more charges must be paid for the use of the external lines.

Further, a structure to execute data transmission to the external apparatus in accordance with data transmission starting conditions has also been proposed.

However, unless setting or modification means for the transmission starting conditions is provided in the copying machine, the operator cannot cope with the situation when the operation presents a state where the transmission starting conditions should be modified or when a situation arises wherein the external apparatus, which executes a centralized control, should modify the transmission starting conditions on its side. A service engineer must be dispatched to the location where the particular copying machine is installed to modify the setting of the conditions as desired. As a result, there is a problem in that the required corrective operation is inevitably delayed.

Also, there has been proposed a copying machine which is capable of transmitting the abnormal conditions of the copying machine and the functional data thereof through a specific external apparatus and communication lines when the performance of the machine becomes abnormal.

However, unless data are transmitted to the external apparatus each time an abnormality, paper jamming or the like occurs in the copying machine, it is impossible to make detailed historical records. Therefore, it is necessary to monitor the copying machine at all times in order to avoid a delay in taking any corrective actions.

Also, number of models of copying machines has been increasing year after year, and the data which should be stored in the copying machines become mixture of those common to each of the different copying machines and those proper to each of the specific copying machines. These mixed data are transmitted to the external apparatus as they are.

On the side of the external apparatus, which controls a plurality of copying machines, if the data processing is executed using a common soft ware, then the kinds of the objective copying machines must be detected for sorting the common data and to rearrange their sequence in accordance with the common format because the arrangement order of the data being transmitted from each of the copying machines is different according to the kinds thereof. Such a problem as this requires more of a load on the side of the operational administration department, leading to the resultant problem of delay in taking corrective measures.

Also, there has been proposed a copying machine structured to be able to communicate with one specific external apparatus through communication lines at calling the apparatus by its assigned telephone number, for example, thus enabling periodical or occasional transmission and reception of data between the copying machine and the external apparatus installed in the operation control section.

However, there is a problem in that the required user service is hindered when various data stored in the copying machine are not collected by the operation controlling source for long periods of time. For example, the communication between them may be disabled due to trouble in the external apparatus installed in the operation control section, which is stored in the copying machine as a specific party of communication, or an abnormality in the communication lines connected to the external apparatus, or some other causes.

Also, even when the data should be transmitted to inform the operation control section of the signs of an abnormality or the occurrence of abnormalities, the data are to be retained in the copying machine until a time when the transmission instruction is received from the operation control section or the like, in spite of the abnormality indication appearing on the display unit of the copying machine. On the side of the operation control section, too, the information is not received in real time, titus creating the problem of a delay in the taking of appropriate corrective measures.

Further, there has been proposed a copying machine structure to be able to communicate with an external apparatus through communication lines by calling the apparatus by a telephone number, for example, and the structure is further arranged so that transmission and reception of data are made possible between the copying machine and the external apparatus installed in the operation control section periodically or occasionally.

However, in order to carry out the centralized control of a plurality of the copying machines with the external apparatus, the connecting information (for example, a telephone number) for the external apparatus is registered by each of the copying machines in this case.

Therefore, if the copying machines are to transmit data simultaneously, congestion takes place in the communication lines and the state of line-busy will ensue. Then, the data will be transmitted after waiting for the clearance of the communication jam. Hence there is a disadvantage in that the data cannot be transmitted efficiently.

SUMMARY OF THE INVENTION

It is an object of the present invention to provide an equipment control apparatus by which the above-mentioned problems have been solved.

It is another object of the present invention to provide an improved equipment control apparatus.

It is a further object of the present invention to provide an equipment control apparatus in which the kind of data for an equipment to transmit and the kind of data for a control apparatus to transmit are automatically transmitted to the is external apparatus at an appropriate time when these data are needed.

It is a still further object of the present invention to provide an equipment control apparatus which dose not increase the time required to transfer and transmit data when the transfer and transmission of the data are demanded while the equipment is being controlled, or hinder the other communications by occupying the external lines for a long time, or create any problem wherein the charges for using the lines should become excessively high.

It is another object of the present invention to provide an equipment control apparatus capable of transmitting data regarding the functions and operating conditions of the copying machine automatically to the control apparatus when the transmission starting conditions are met as the preset transmission conditions stored in the equipment, and further capable of modifying the stored transmission starting conditions.

It is a further object of the present invention to provide an equipment control apparatus capable of collecting data on the abnormalities, functions, and other of the equipment and its historical records using only the control apparatus side only in accordance with the periodical data transmission from the equipment.

It is a still further object of the present invention to provide an equipment control apparatus which is capable of transmitting the control data so that the control apparatus can perform sum up processing and others of the transmitted control data received from a plurality of equipment using a common soft ware.

It is a still more further object of the present invention to provide an equipment control apparatus which usually, communicates with a specific control apparatus, and also performs a connection with a reserve control apparatus stored in advance for a necessary communication when the communication with such a specific control apparatus is disabled.

It is a further object of the present invention to provide an equipment control apparatus which enables the equipment to transmit data automatically to the control apparatus when its state and conditions take place as supposed.

It is a still further object of the present invention to provide an equipment control apparatus capable of performing the transmission and reception of data efficiently by increasing the possibilities of coupling the communication lines between the equipment and the control apparatus, and automating the coupling procedures at the time of communication line congestion.

BRIEF DESCRIPTION OF THE DRAWINGS

FIG. 15 is an example of a table showing the history of abnormality occurrences.

FIG. 17 is an example of a table showing the history of paper jam occurrences.

FIG. 19 is an example of a table showing the s history of transmissions.

FIG. 21 is an address map showing the transmitting data from the top according to the is twelfth embodiment.

FIG. 22 is a control data transmission flow chart according to the thirteenth embodiment.

FIG. 23 is an address map showing the transmitting data from the top according to the s thirteenth embodiment.

DETAILED DESCRIPTION OF THE PREFERRED EMBODIMENTS

Hereinafter, a copying machine according to the present invention will be described in accordance with its embodiments.

Figure 1:
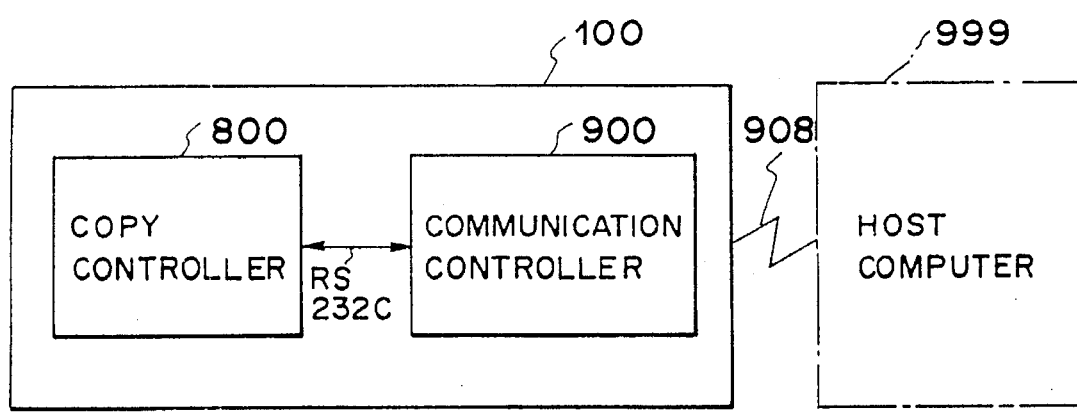
FIG. 1 is a block diagram schematically showing the structure of the present invention.

FIG. 1 is a block diagram schematically showing the structure of a copying machine according to an embodiment of the present invention.

A reference numeral 100 designates the main body of the copying machine; 800, a copy controller for controlling the copying operation; 900, a communication controller (modem board) for performing the transmission and reception of data between external communication lines and the copying machine; 908, a public telephone circuit which serves as the external communication lines; and 999, a host computer system which serves as the external apparatus installed in a operation control section or the lime for controlling the copying machine 100.

Figure 2:
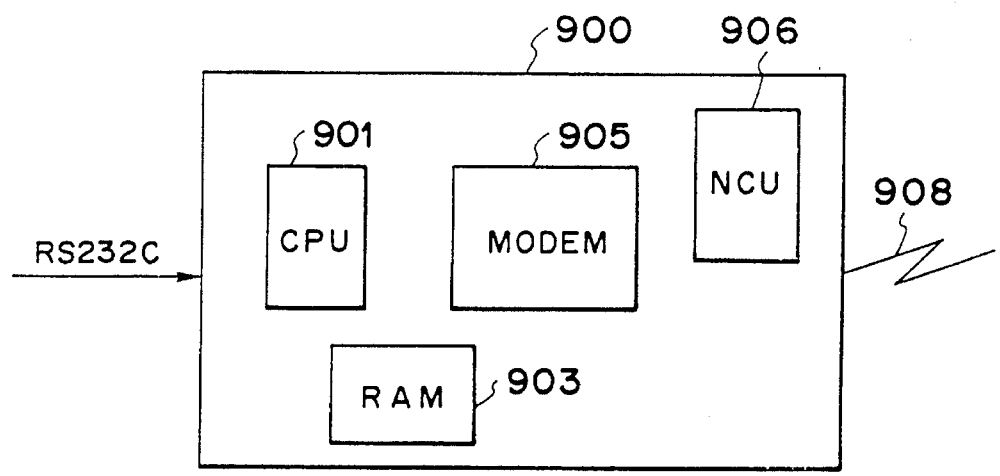
FIG. 2 is a schematic structural diagram showing a communication controller 900.

FIG. 2 is a block diagram showing the principal structure of the communication controller 900.

A reference numeral 901 designates a central arithmetic processing unit (hereinafter referred to as CPU) for controlling communications; 903 a random access memory (RAM) for temporarily storing communication data; 905, a modulator-demodulator (modem) for modulating digital communication data for transmitting through the public telephone circuit 908 and also for demodulating the data received through the public telephone circuit 908 into the digital communication data; and 906, a network control unit (NCU).

By the controlling performed by the copy controller 800 and communication controller 900 structured as above, communication with the external apparatus 999 is conducted through the copying operation of the copying machine 100, data storage, and external communication lines 908.

Now, the description will be made of the copy controller 800 and a communication controller 900.

Figure 3:
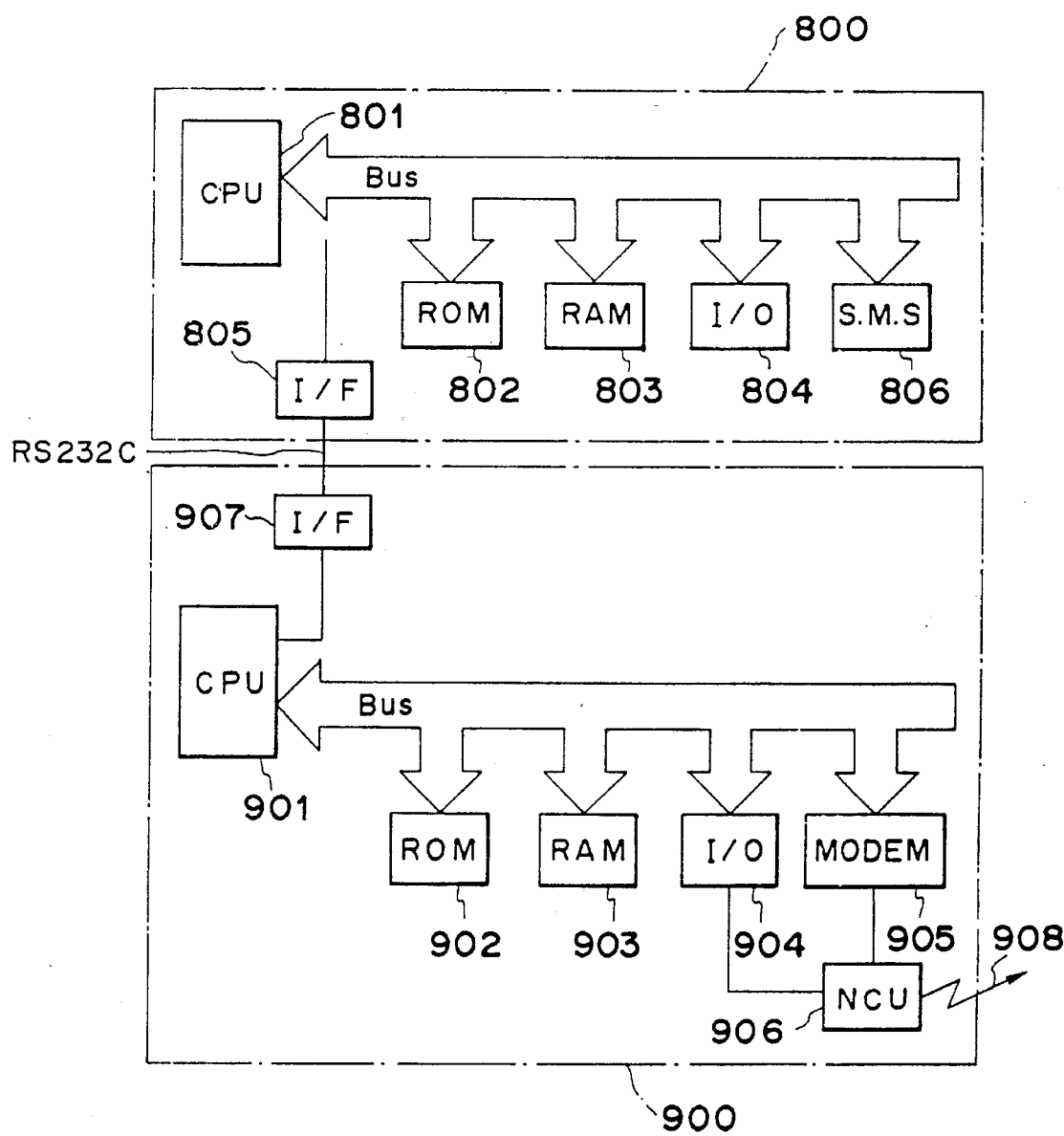
FIG. 3 is a block diagram showing a copy controller 800 and the communication controller 900.

FIG. 3 is a block diagram showing the copy controller 800 and communication controller 900.

A reference numeral 801 is a central arithmetic processing unit (hereinafter referred to as CPU) for controlling the entire system of the copying machine; 802 a read only memory (hereinafter referred to as ROM) for reading the stored control sequence (control program) for the main body of the copying machine 100. The CPU 801 controls each of the structural units connected thereto through buses in accordance with the control sequence stored in the ROM 802.

Also, the CPU 801 has a function to detect the state wherein the copying machine 100 is not prepared to transmit its state and conditions to the external apparatus.

A reference numeral 803 designates a random access memory (hereinafter referred to as RAM) which serves as a principal storage unit used as a storage of the inputted data or a working storage area or the like, and the telephone number and others, which are required to start communicating with the external apparatus 999, are also stored therein.

In addition, the RAM 803 stores plural kinds of data to be transmitted to the external apparatus 999.

A reference numeral 802 designates an output/input unit IC (hereinafter referred to as I/O) for outputting the control signals of the CPU 801 in response to the load of the main motor 113 and others and for inputting signals from the sensor and others of the fixing device to transmit them to the CPU 801.

Then, the CPU 801 retains the copying number setting value corresponding to each of the kinds of the aforementioned data stored in the RAM 803 and compares the copying number coefficient value counted with respect to each of the copying number setting values.

A reference numeral 806 designates a service mode switch for performing the selection of the copying number setting values for modification or second input. Also, the CPU 801 detects the current state of consumption of the expendables and the necessity of its replacement, replenishment or the like.

The communication controller 900, which control communications with the external communication lines 908, is controlled by the inner CPU 901. Here, a reference numeral 902 is a read only memory (ROM) for storing the program for communication control, connection procedure and others. Then, the copy controller 800 in the main body of the copying machine 100 and the communication controller 900 are coupled through RS-232C interfaces 805 and 907. When a data transfer is executed from the copy controller 800 in the main body of the copying machine 100 through this RS-232C interface 907, the transferred data are provisionally stored in the RAM 903 installed in the communication controller 900. Then, after the termination of the data transfer from the copy controller 800, the NCU 906 is controlled by the CPU 901 to connect the communication lines with the external apparatus 999. Thus, the data transfer to the outside is executed through the modem 905 and NCU 906 subsequent to the connection of the communication lines.

Also, when a data transfer from the external apparatus 999 is executed, the transferred data are provisionally stored in the RAM 903, and the data are transferred to the copy controller 800 through the RS-232C interfaces 805 and 907 as required by the copy controller 800.

The data referred to in this respect are the data and information to be stored in the data storage means RAM 803 installed in the copying machine. Also, for the demands on the data transfer, there is a case where a demand results from the occurrence of abnormality in copying control on the copying machine side, the occurrence of paper jamming, or the periodical reporting time and the control of the copying machine which will be described later, and there is another case where such a demand arises when the data collection is to be executed on the external controlling side.

Figure 4:
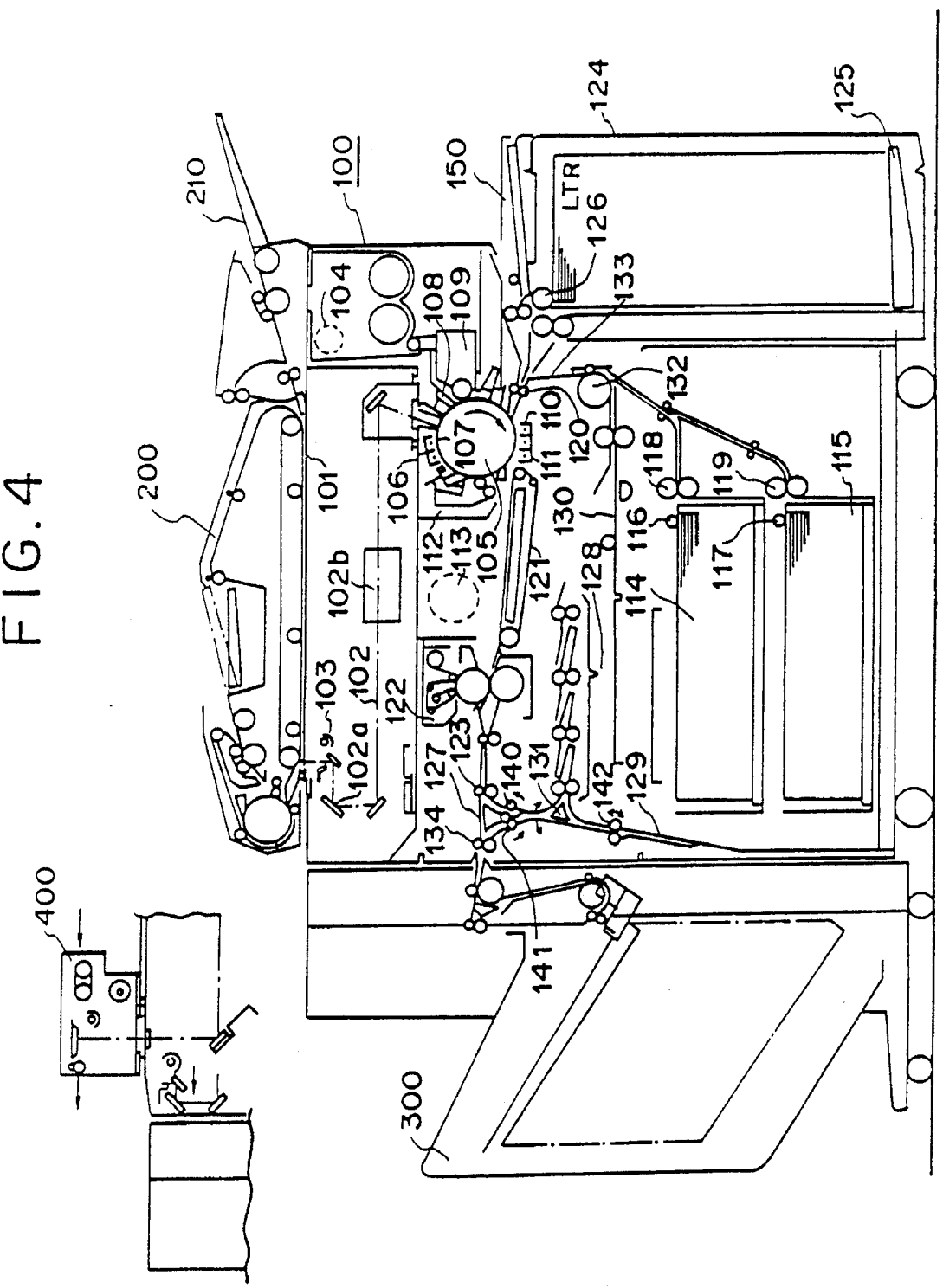
FIG. 4 is a cross-sectional view showing a copying machine according to an embodiment of the present invention.

FIG. 4 is a cross-sectional view illustrating the structure of the copying machine 100. With reference to FIG. 4, the structure and operation thereof will be described.

A reference numeral 100 designates the main body of the copying machine; 200, a recurring automatic document feeding device (hereinafter referred to as RDF) for carrying out the automatic feeding of documents; 300, a sorter for classifying the copied sheets; 400, an automatic computer form feeding device (hereinafter referred to as CFF). The above-mentioned RDF 200, sorter 300 and CFF 400 are arranged to be used freely in combination with respect to the main body of the copying machine 100.

Now, the description of the structure of the main body of the copying machine 100 will be given below.

In FIG. 4, a reference numeral 101 designates a document setter glass for mounting a document, and 102, an optical system for reading the document, which is composed of a exposure lamp 703 for illuminating the document, a scanning mirror 102*a*, lens 102*b*, motor 104 and others. While the scanning mirror 102*a*, lens 102*b*, and exposure lamp 103 are moved by the motor 102, the document is illuminated by the exposure lamp 103. Then, the reflecting light from the document is irradiated to the light sensitive drum 105 by the guidance of the scanning mirror 102*a* and lens 102*b*.

Around the light sensitive drum 105, there are provided a high-voltage unit 106, a blank exposure light 107, and electrical potential sensor 108, a developer 109 and transfer charging device 110, a separation charging device 111, and a cleaning device 112. With the light sensitive drum 105 and others, an image is recorded on a sheet which has been fed.

The light sensitive drum 105 is driven by the main motor 113 in the rotational direction, indicated by an arrow, while being charged with corona by the high-voltage unit 106. Then, when the reflecting light from the document is irradiated by the optical system 102, an electrostatic latent image is formed. This electrostatic latent image becomes visible as a toner image when developed by the developer 109.

On the other hand, a copying sheet, which is fed into the main body 100 by feeding rollers 118 and 119 after having been separated by pick up rollers 116 and 117 from an upper cassette 114, a lower cassette 115, is carried toward the light sensitive drum 105 after a timing has been taken by a resist roller 120 so that the leading end of the toner image on the light sensitive drum 105 is matched with the leading end of the copying sheet. Thus, the toner image on the light sensitive drum 105 is transferred to the copying sheet by the transfer charging device 110. Subsequent to this transfer, the copying sheet is separated by the separation charging device 111 from the light sensitive drum 105, and is guided by a cover or belt 121 to a fixing device 122. The toner image is pressed and heated by the fixing device 122 for its fixation. After that, the copying sheet is exhausted by an exhaust roller 123 to the outside of the main body of the copying machine 100. Also, the surface of the light sensitive drum 105 is cleaned by the cleaning device 112.

In the main body of the copying machine 100, a deck 124 is mounted for storing 4,000 copying sheets, for example.

The lifter 125 for the deck 124 is raised in accordance with the volume of the copying sheets stored so that the copying sheet is in contact with the feed roller 126 at all times.

The copying sheet, which has been exhausted from the exhaust roller 123, is guided by an exhausted sheet flapper 127 into either one of the both-face recording side, multi-recording side, and exhaust side. Here, a reference numeral 128 designates a lower conveying pass, and the copying sheet exhausted from the exhaust roller 123 is reversed by a reversing pass 129 and is guided to a refeeding tray 130.

A reference numeral 131 designates a multi-flapper for switching over the passes for the both-face recording and the multi-recording. By tilting this flapper to the left-hand direction, the copying sheet is guided to the lower conveying pass 128 directly without guiding it to the reversing pass 129; 132, a feed roller for carrying the copying sheet to the light sensitive drum 105 side through a pass 133; and 134, an exhaust roller which is arranged in the vicinity of the exhaust sheet flapper 127 for exhausting the copying sheet, which has been switched over to the exhaust side by the aforementioned exhaust sheet flapper 127, to the outside of the copying machine.

When a both-face recording (both-face copying) or multi-recording (multi-copying) is performed, the exhaust flapper 127 is placed upward to store the copied sheet in the refeeding tray 130 through the reversing pass 129 and lower conveying pass 128 in this case, at the time of the both-face recording, the multi-flapper 131 is tilted to the right-hand direction, and at the time of the multi-recording, the multi-flapper 131 is tilted to the left-hand direction. Then, at the time of subsequent recording of the reverse side of the copied sheet or multi-recording, the copying sheets stored in the refeeding tray 130 are guided to a resist roller 120 one by one by the feed roller 132 from the bottom through the pass 133.

When the copying sheet is exhausted from the main body of the copying machine 100 in the reversed state, the exhaust sheet flapper 127 is placed upward while the flapper 131 is tilted to the right-hand direction, and the copied sheet is carried to the conveying pass 129 side. Then, after the traling end of the copying sheet has passed the first feed roller 140, it is carried by a reversing roller 142 to the second feed roller 141 side. Thus, the copying sheet is reversed and exhausted by the exhaust roller 134 to the outside of the machine.

Now, the operation panel will be described.

Figure 5:
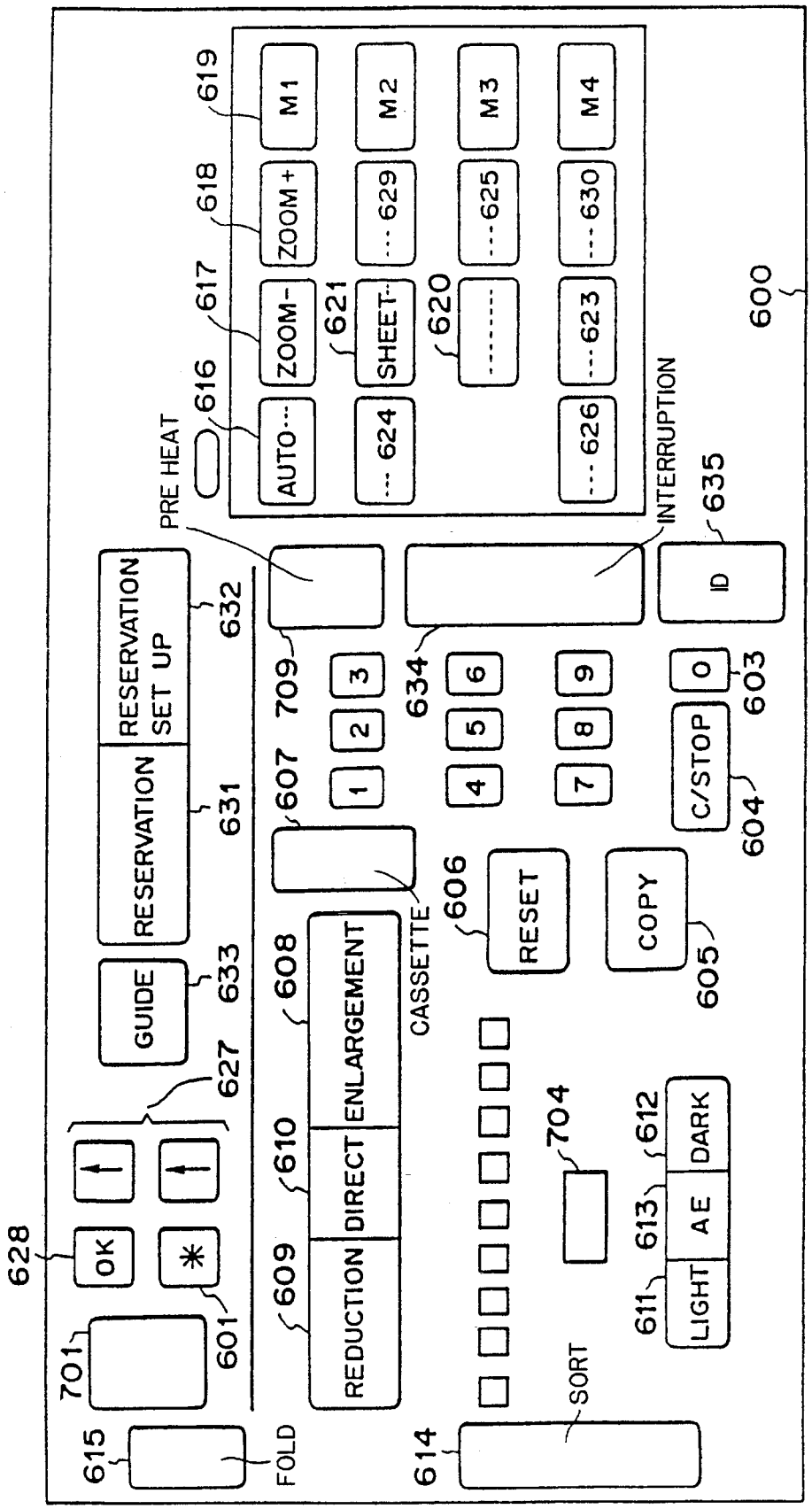
FIG. 5 is a view showing the appearance of the operation panel according to an embodiment of the present invention.

FIG. 5 is a view illustrating an example of the appearance of the operation panel 600 provided for the main body of the copying machine 100.

A reference numeral 601 is a asterisk (*) key for an operator (user) to use in a setting mode such as setting a size of binding space or a size for erasing the frame of a document; 627, a cursor key to be used for the selection of the setting items in the setting mode; 628, an OK key to be used for defining the set contents in the setting mode.

A reference numeral 606 designates an all reset key which is depressed for returning to the standard mode. Also, the all reset key 606 is depressed to restore the standard mode from the auto-shut off state.

A reference numeral 605 designates a copy start key which is depressed for starting the copying operation.

A reference numeral 604 designates a clear/stop key to serve as a clear key at standby while serving as a stop key in the copy recording operation. The clear/stop key 604 is depressed when a set copy number is released or a continuous copying is suspended. Then, after a particular copying when this key is depressed is over, the copying operation will be suspended.

A reference numeral 603 designates ten keys which are depressed for setting a required copy number. Also, this set of keys is used in setting the asterisk (*) mode; 619, a memory key to register the modes which the user uses frequently. Here, four modes from M1 to M4 can be recorded.

Reference numerals 611 and 612 designate keys for adjusting copying densities, which are depressed for its manual adjustment; 613, an AE key which is depressed for adjusting the copying densities automatically in accordance with the density of the document or for releasing the AE (automatic exposure adjustment) for switching over to the manual density adjustment.

A reference numeral 607 designates a copying sheet selection key which is depressed to select either one of the upper paper lifter 119, lower paper lifter 115, paper deck 124, and multi-manual setting 150. Also, when a document is mounted on the sorter 300, it is possible to select she APS (automatic paper cassette selection) by that copying sheet selection key 607. When the APS is selected, a cassette having the same size as the document is selected automatically.

A reference numeral 610 designates a direct key which is depressed for performing a direct copying (original dimensions) of a document. Reference numeral 616, an automatic variable power key which is depressed for automatic designation of the reduction or enlargement of the image of a document in accordance with the size of a designated copying sheet.

A reference numeral 626 designates a both-face key which is depressed when a both-face copying from a one-side document, both-face copying from a both-face document, or a one-side copying from a both-face document is performed; 625, a binding space key which sets aside a binding space of a designated length on the left-hand side of a copying sheet; 624, a photography key which is depressed for copying a photographic document; and 623, a multi-key which is depressed for forming (synthesizing images) on the same surface of a copying sheet from two documents.

A reference numeral 620 designates a document frame erasing key which the user depresses for erasing the frame of a set sized document, and the size of the document in such a case is set by depressing the asterisk key 601; and 621, a sheet frame erasing key which is depressed for erasing the frame of a document by matching it with the size of the copying sheet to be used.

A reference numeral 629 designates a cover mode setting key used for producing a cover and a back cover and inserting interleaves; and 630, a continuous copying key for a page which is used for copying the left and right hand sides of a spread book in succession.

A reference numeral 614 designates a sheet exhausting method selection key for selecting the staple sort, sort, or group exhausting method, and when the staple sorter 300 is connected, the selection of a staple sort mode, sort mode, or a group mode or release thereof is possible.

A reference numeral 631 is a reservation key which is used for starting a copying mode setting for a reserved document stacked on the reservation tray 210 and also for releasing reservation settings; 632, a reservation setting key which is used as a key for defining a reservation mode when it is set.

A reference numeral 633 designates a guide key which is used when displaying on the display 701 an explanation of the function for each of the various keys.

A reference numeral 701 designates the message lo display on which information regarding copying and communications are displayed. Characters and figures can be displayed in 96×129 dots in a liquid crystal display (LCD). For example, the copying number set by the ten keys 603, the copy magnification factors set by the set form variable power keys 608 and 609, direct key 610, and zoom keys 617 and 618, the sizes of copying sheets selected by the copying sheet selection key 607, the messages indicating the state of the main body of the copying machine 100, the guide messages showing the operational sequence, and other information such a setting content of each of the modes are displayed.

A reference numeral 702 designates the AE indication device which is illuminated when the AE (automatic exposure adjustment) is selected by the AE key 613; and 709, a preheating indication device being illuminated in a preheating state.

In using the RDF 200 in the standard mode, the setting is that; the number of the copying sheet is one, the density is the AE mode, the sheet selection is automatic, the variable power is direct, and the copying mode is the one-side copy from a one-side document. In the standard mode but not using the RDF 200, the setting is that; the number of the copying sheet is one, the density is the manual mode, the variable power is direct, and the copying mode is the one-side copy from a one-side document. The difference between the case wherein the RDF 200 is used and the case wherein the RDF 200 is not used is determined by whether or not the document is set on the RDF 200.

Now, the description will be made of the control such that the characteristic copying machine embodying the present invention transmits data automatically to an external apparatus installed in an operational section or the like when a predetermined copying number is reached.

Figure 6:
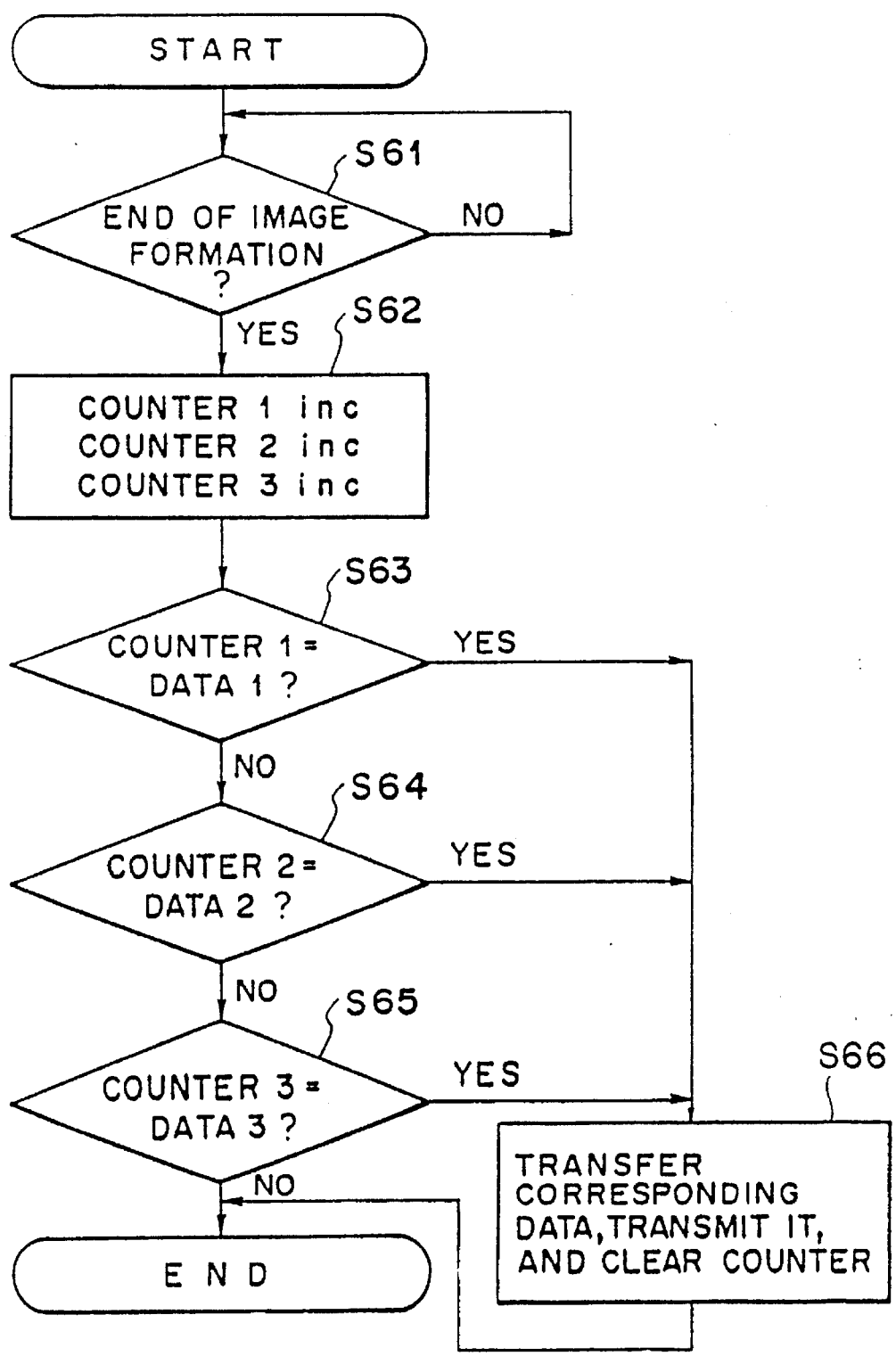
FIG. 6 is a flow chart showing the control data transmission according to the first embodiment.

FIG. 6 is a flow chart for the first embodiment in which when the designated copying number set for each kind of data to be transmitted is reached, the corresponding kind of data is transmitted s to an external apparatus. In this respect, in counter means, there are provided three counters for three kinds of data, respectively, and it is assumed that a different setting value is set for each of the counters.

In step S61, when the image formation for the copying operation for a one-time portion is terminated, the process proceeds to step S62 to increment each of the copying number counting value data on the RAM 803 which are used as the counter 1, 2, and 3. Then, in step S63, the copying number counting value of the counter 1 is compared with a predetermined copying number counting value of the data 1 stored in RAM 803 in advance. If the compared values are the same, the process will proceed to step S66. Then, the copying number setting value data 1 stored in the RAM 803, which serves as storage means for the transmitting data and a kind of data corresponding to the copying number counting value 1, are transferred by transferring means from the copy controller 800 to the communication controller 900. Hence transmitting them to the external apparatus 999 by the communication controller 900.

Then, the copying number counting value counter 1 is cleared and the copying number coefficient and the copying number setting value are again compared.

In the step S63, if the value of the counter 1 and data 1 are not the same, the process will proceed to step S64 to compare a copying number setting value of the data 2, which is set on the RAM 803 in advance and the copying number counting value of the counter 2. If the compared values are the same, the process will proceed to the step S66 to transfer the data 2 and the data corresponding to the counter 2 for transmission. Then the counter 2 will be cleared likewise.

If the values of the counter 2 and data 2 are not the same in the step S64, the process will proceed to step S65. Then, as described above, the values of the data 3 and counter 3 are compared in the same manner. If the compared values are the same, the corresponding data is transmitted, and then the counter 3 will be cleared.

As described above, it is possible to perform the data transmission automatically when the copying number for each kind of the data reaches its set number by setting a desired copy termination number for each kind of the stored data respectively for the copying number setting values of the data 1, data 2, and data 3.

Figure 7:
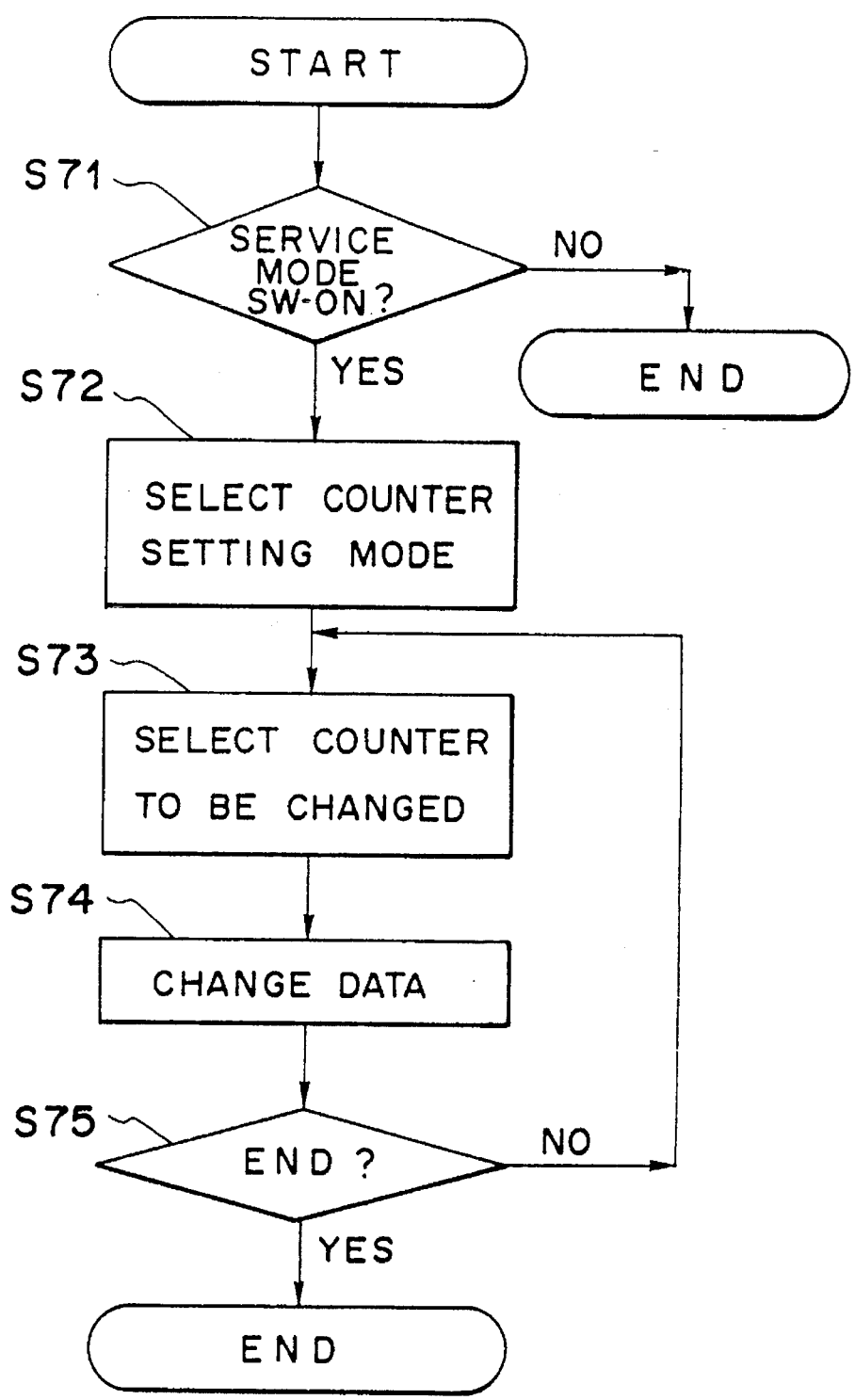
FIG. 7 is a flow chart showing the second embodiment.

FIG. 7 is a flow chart for the second embodiment in which the data of the copying number setting values are modified to desired values.

In step S71, the service mode switch 806, which can be used only by a service man, is operated to enter a service mode. Then, the process proceeds to step S72 to select a mode for setting the data for the copying number setting values from a plurality of service modes.

Then, the process proceeds to step S73 to s select a counter corresponding to the kind of data which should be modified. After the counter is selected, the data in the counter are cleared or the setting value is modified in step S74. After that, in step S75, whether the modification is terminated or not is determined. If the data of any other counter should be modified, the process will return to the step S73 to repeat the above-mentioned operation.

Figure 8:
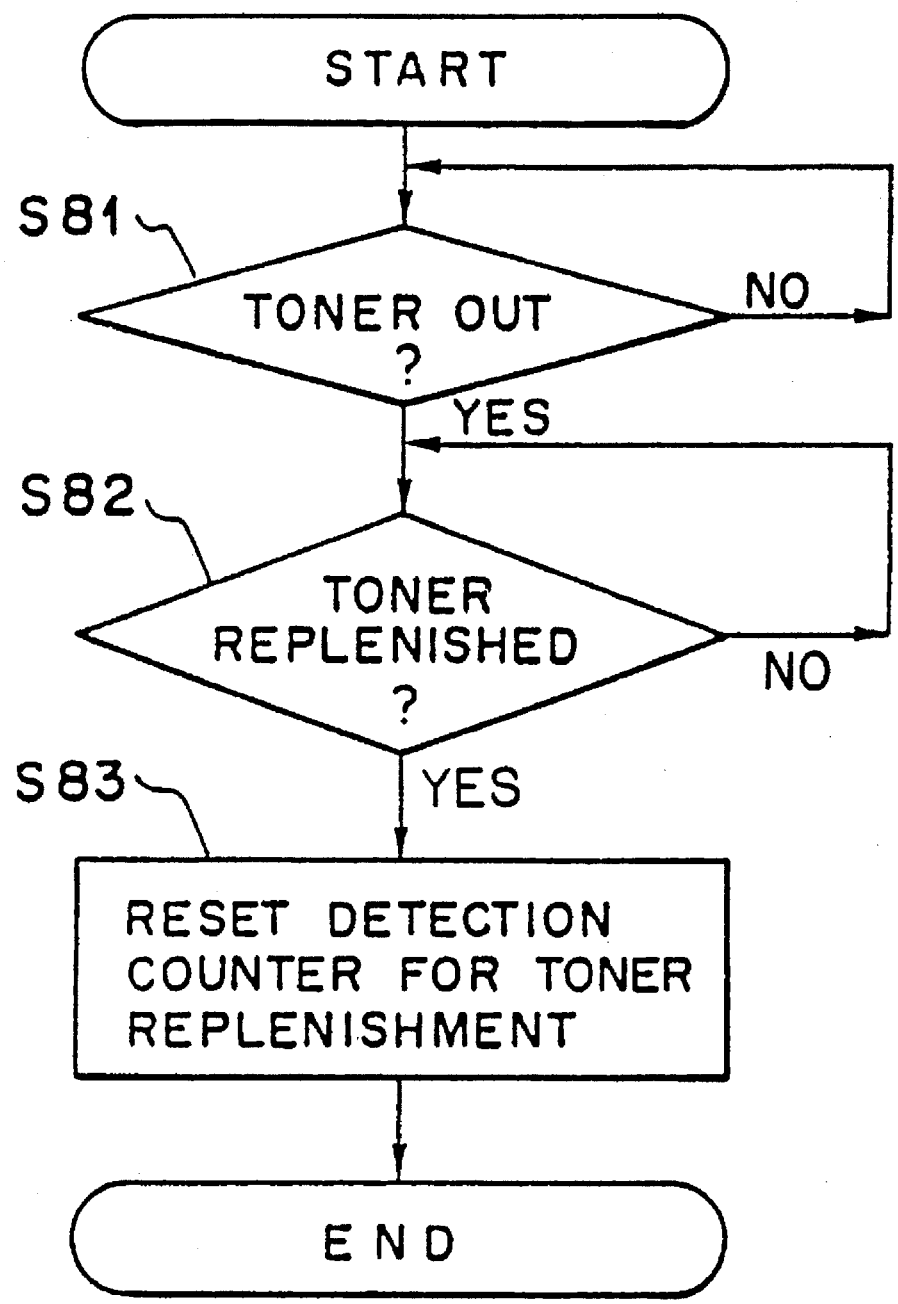
FIG. 8 is a flow chart showing the control data transmission according to the third embodiment.

FIG. 8 is a flow chart for the third embodiment in which the related data are transmitted in accordance with the copying number subsequent to the time of the replacement or replenishment of the expendables.

In step S81, when the aforementioned detecting means detects that the toner has been completely o consumed, the process proceeds to step S82 to examine whether the toner has been replenished by the user or not. If the detection indicates that the toner has been replenished, the process will proceed to step S83.

In the step S83, the copying number counting value counter for detecting the toner replenishment is cleared and reset.

Subsequently, the counter for the copying number values is incremented after each of the copying operations and when the incremented value matches with a predetermined copying number setting value data, the transmission of the data of the corresponding kind is performed.

With the above-mentioned control, it is possible for the operational control section to know data of the related information after the replenishment of the toner at appropriate times.

In this way, the copying machine can perform its copying operations under the control of copy controlling means and perform its transmission and reception of data transfer and reception to and from the external apparatus installed in the operational control section or the like by the function of communication controlling means.

In the transmitting data storage means, plural kinds of data to be transmitted to the external apparatus are stored, and the counter means compares the copying number setting value for each kind of the data stored in the transmitting data storage means and the copying number counting value obtainable by counting the copying number for each of the copying number setting values. Then, when the copying number counting value reaches the corresponding copying number setting value, the data of the kind which corresponds to the aforementioned copying number setting value stored in the transmitting data storage means are transferred to the communication controlling means and transmitted to the external apparatus by the communication controlling means. Also, the copying number counting value corresponding to the aforementioned transmitted data is cleared and reset. Then, the comparison of the copying number counting value and the copying number setting value is again performed.

Thus, as described above, it is possible to transmit the kind of data required for the copying machine to transmit as well as the kind of data required for the operational control section automatically to the external apparatus at the appropriate time when such data are needed. Therefore, the operational control section or the like can execute its control operation such as the collection of the necessary data from a plurality of copying machine and its summing up process easily and promptly hence making it possible to implement control and maintenance and other requirements appropriately and immediately by collecting data related to the current operational status and functional conditions of a plurality of copying machines efficiently.

Figure 9:
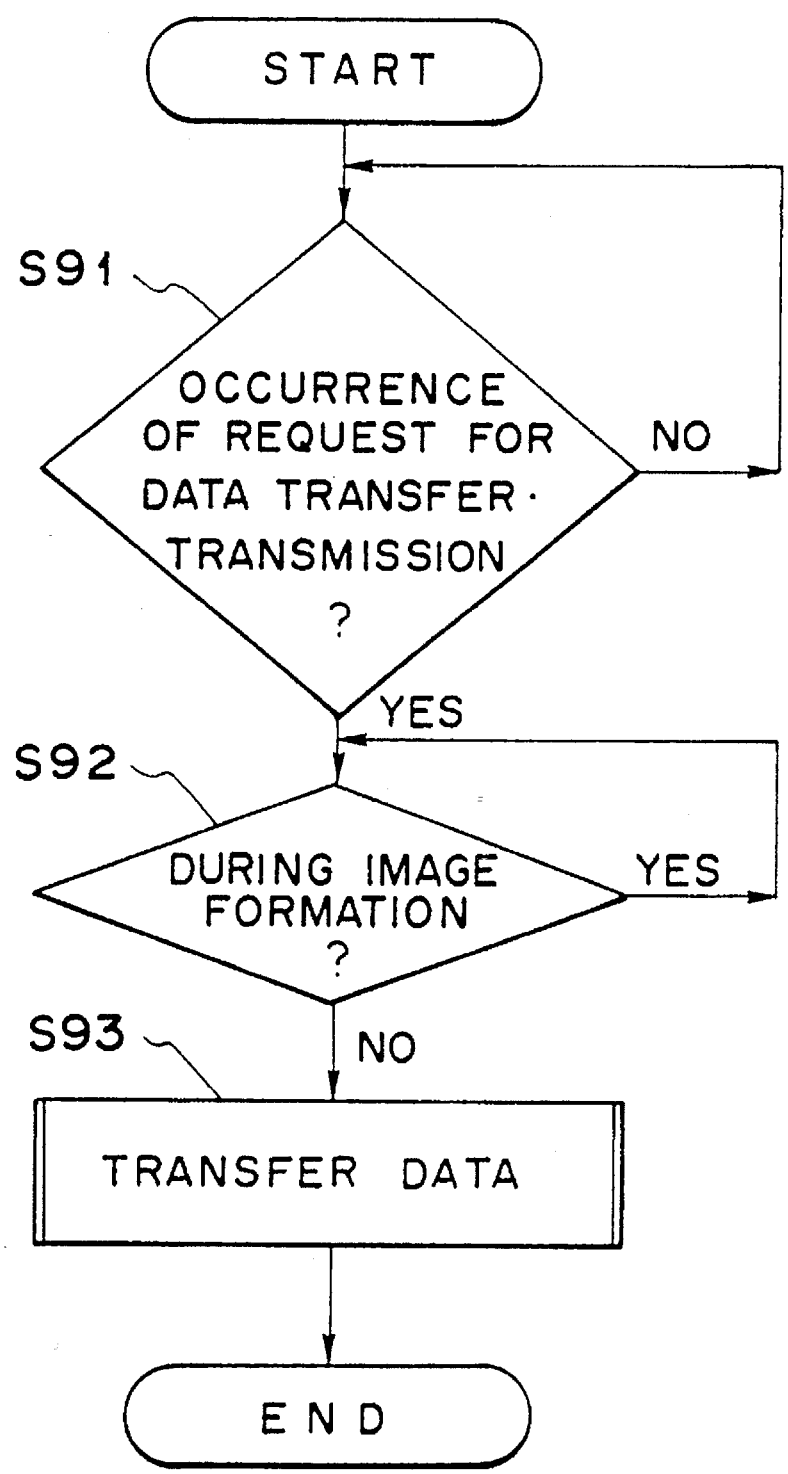
FIG. 9 is s controlling flow chart according to a fourth embodiment.

FIG. 9 is a flow chart for the fourth embodiment in which the data transfer and transmission are controlled by the CPU 801.

In step S91, if any request for data transmission occurs in the copying machine 100 or request for data transfer or transmission is made by the external apparatus 999 through the communication lines 908, the process proceeds to step S92. Then, whether the image formation is still in progress or not is examined by the CPU 801. If the image formation is in progress, whether the image formation is still in progress or not is repeatedly examined, and the process proceeds to step S93, when it is found that the image formation is no longer in progress. Thus, the data transmission starts as requested by transferring the transmitting data stored in RAM 803 through the inner bus 805.

With the series of the controlling operations of the CPU 801 described above, the data transfer is disabled during an image formation, and data transfer and transmission will be performed after the termination of the image formation.

Now, the description will be made of the fifth embodiment which is structured the same as the aforementioned embodiment but its transfer and transmission controls are slightly different therefrom.

Figure 10:
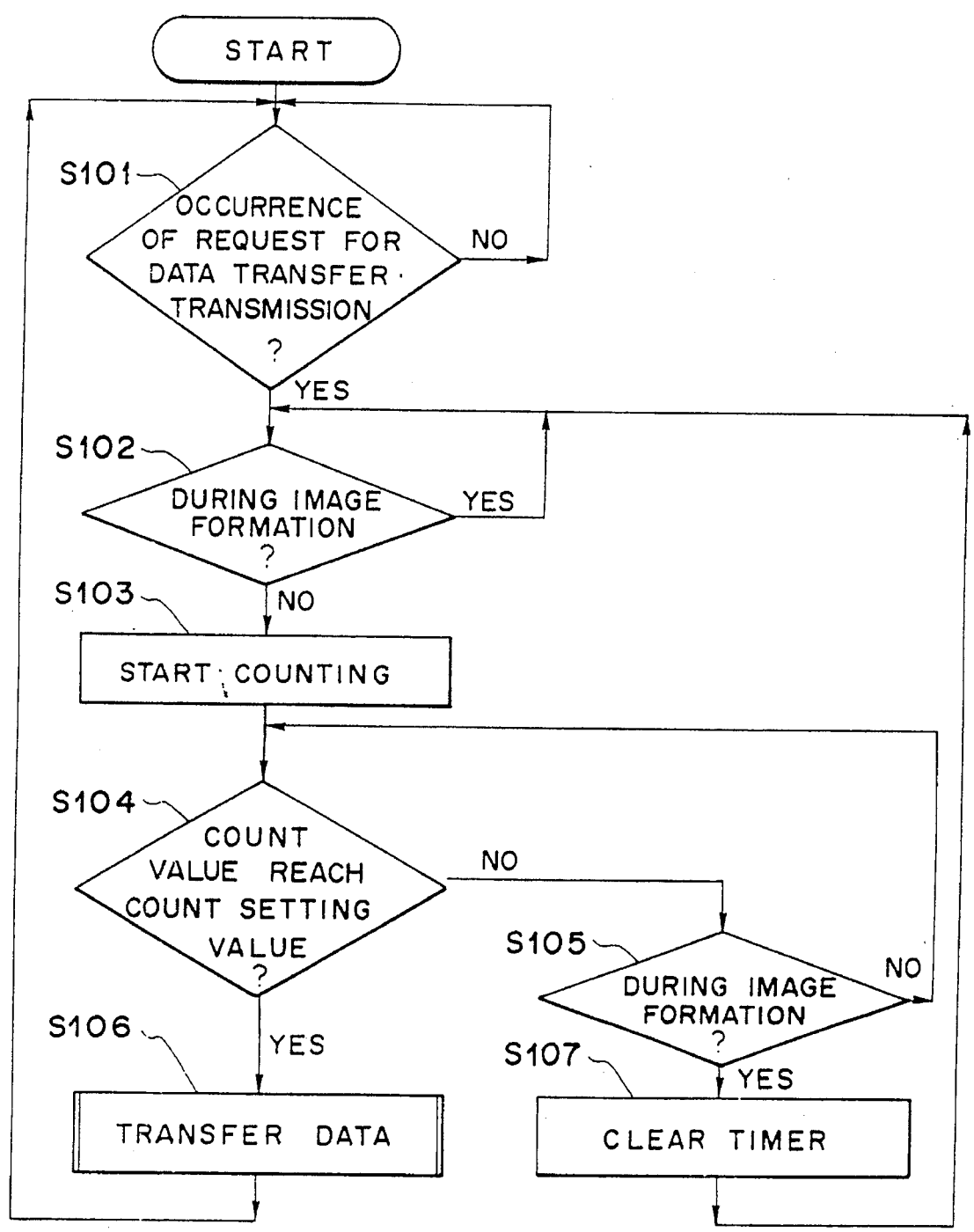
FIG. 10 is a controlling flow chart according to the fifth embodiment.

FIG. 10 is a flow chart showing the controlling operations of the CPU 801 according to the fifth embodiment. In this respect, a timer which performs counting in step S103 is regulated by an inner clock provided for the CPU 801.

In the step S101, if a request for the data transmission occurs in the copying machine 100 or request for data transfer and transmission is made by the external apparatus through the communication lines, the process proceeds to step S102. Then, the CPU 801 examines, as in the case of the fourth embodiment, whether the image formation is in progress or not. If the image formation is found to be in progress, the examination is repeated to determine whether the image formation is still in progress or not. When it is found that no image formation is in progress, the timer starts counting using the inner clock provided for the CPU 801. Then, the process repeats step S105 and Step S104 to wait until the counting value reaches a preset counting value equivalent to a predetermined passage of time. When the timer counting value reaches the count setting value, the process proceeds to step S106 to start transferring the transmitting data stored in the RAM 803 through the inner bus for the requested transmission.

With the above-mentioned controlling operations, the data transfer and transmission are performed after the passage of a specific amount of time subsequent the termination of an image formation, if the data transfer is requested during the image formation.

If an image formation operation is started before the passage of the specific time after this termination of the image formation, the process proceeds to step S105 and then to step S107 to reset the timer to its initial value. Then, the process will return to the step S102 to repeat the examination whether the image formation is in progress or not.

With the above-mentioned controlling operations, the user can continue a copying operation even after the occurrence of the request for data transfer and transmission because the copying operation is not hindered. The data transfer are transmission and performed only after the copying operation is terminated.

In this way, the copying operation is carried out by the copying machine using control means for the image formation performance. Also, by the controlling operation of the control means, the o control data on the image formation are transferred through the inner bus for the transmission to the external apparatus through the communication lines.

Then, even if a request for data transfer and transmission occurs during the image formation, the control means executes the control of the image formation performance, and only after the termination of the image formation, the control means starts executing the data transfer and transmission without controlling the image formation performance any longer.

With the control and operations set forth above, it is possible to provide a copying machine which does not create any problems when a request for data transfer and transmission occurs while the image formation performance is under control because there is no need for the control means to increase the time required for the transfer and transmission or to interfere with some other communications by occupying the external circuit for a longer time. There is also no extra charge required for using the external circuit in this respect.

Subsequently, a description will be made of a control to transmit data automatically to the external apparatus 999, which is installed in an operational control section or the like, when predetermined events or conditions take place in a characteristic copying machine embodying the present invention.

Figure 11:
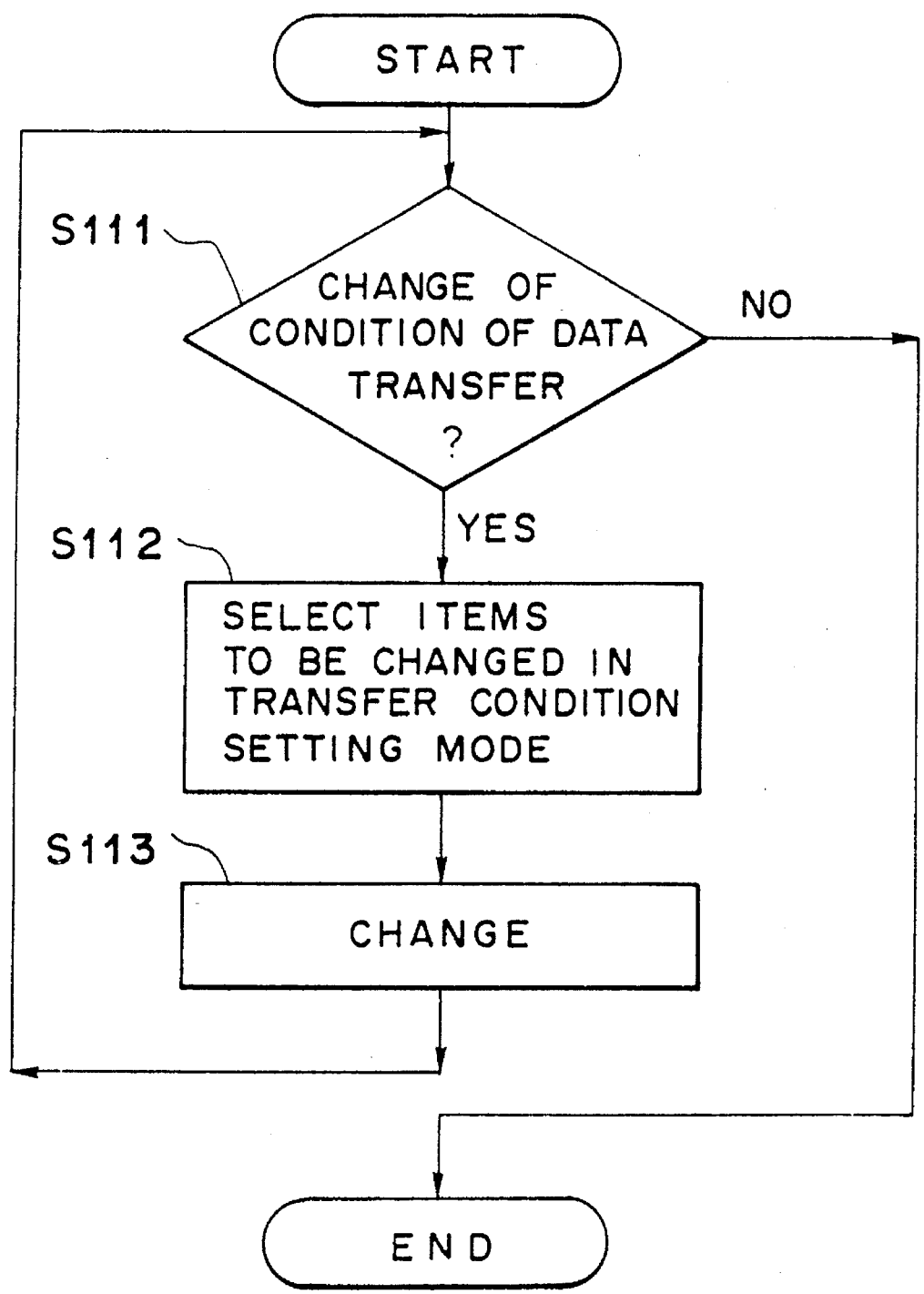
FIG. 11 is a flow chart showing the modification of transmission starting conditions according to the sixth embodiment.

FIG. 11 is a flow chart for modifying the transmission starting conditions for transmitting data on the copying machine 100 automatically to the external apparatus installed in an operational control section or the like according to the sixth embodiment.

In step S111, if transfer starting conditions are modified including any abnormality of the copying machine 100, occurrence of paper jamming, setting of whether or not data are transferred on the basis of its periodical report, setting of the data and time of the periodical report, the process proceeds to step S112 to select the setting mode, which a service man has set through the operation panel 600 of the copying machine 100 as described earlier. In the present embodiment, the setting mode for the data transfer mode is obtainable by depressing KEYs for an input in an order of *9*. Then, the process proceeds to step S113 to designate whether or not the data transfer is executed in the above-mentioned mode when any abnormality or paper jamming occurs or when a periodical report is made. Also, the date, time, day of the week, and other items for the execution of the periodical report are designated.

With the above-mentioned operations, the stored transmission starting conditions in the transmission condition storage means RAM 803 are modified and stored by data input from the CPU 801. Thereafter, the data will be transmitted to the external apparatus 999 when the modified conditions in the storage are met.

Figure 12:
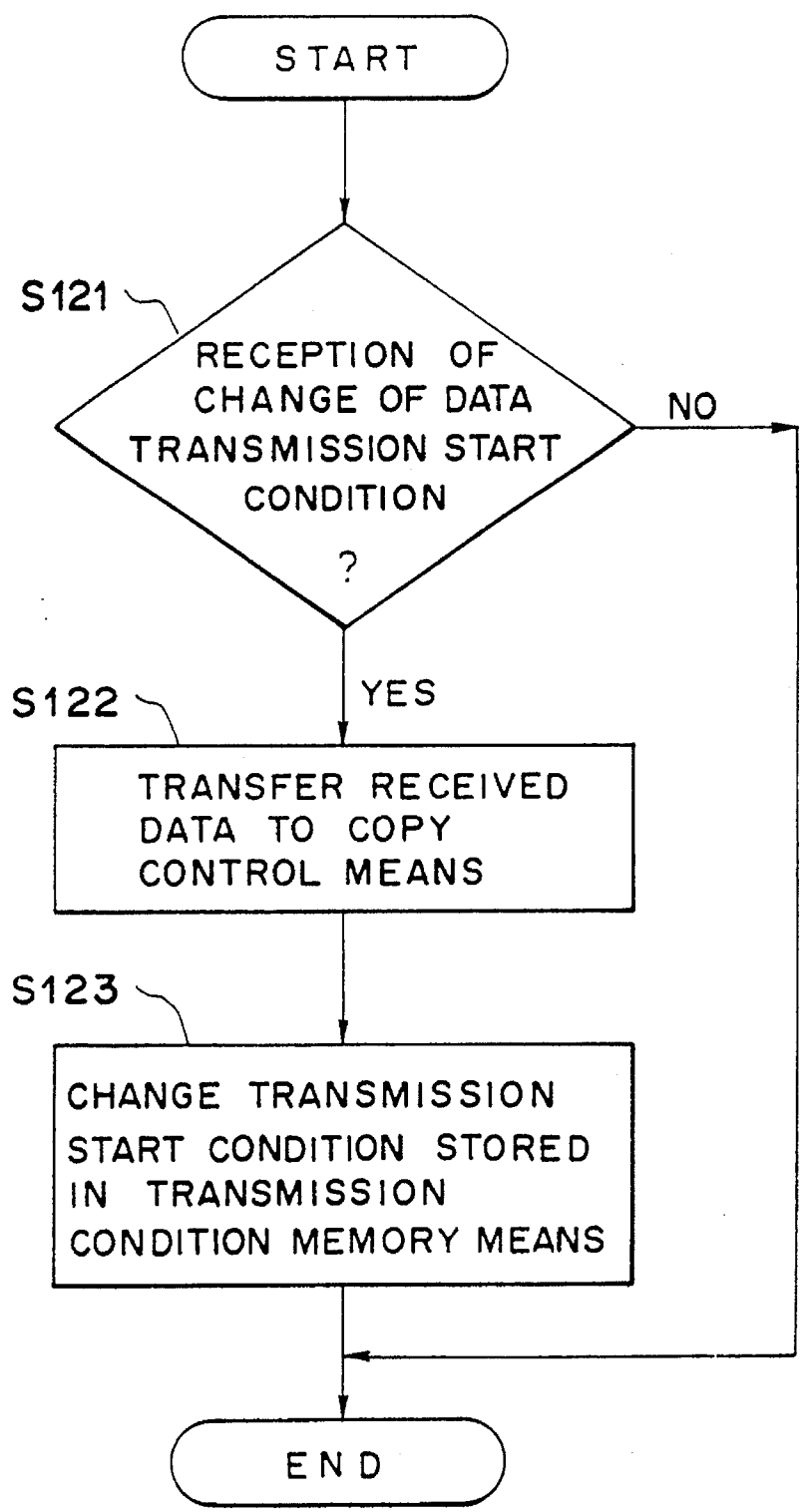
FIG. 12 is a controlling flow chart according to the seventh embodiment.

FIG. 12 is a flow chart for the seventh embodiment for modifying the transmission starting conditions by the data reception from the external apparatus.

In order to modify the transfer starting conditions, including the occurrence of any abnormality and paper jamming, the setting modification of whether or not data transfer is executed with the periodical report, the setting of the date and time for the periodical report, from the external apparatus side, the copying machine receives in step S121 the data transmission starting condition modification, setting data from the external apparatus 999 installed in an operational control section or the like. In step S122, the copying machine transfers the received data to the copy controller 800 through transfer means I/F 907 and 805. Then, in step S123, the stored transmission starting conditions in the transmission condition storage means RAM 803 are modified as the currently transferred data.

With the control described above, it is possible to modify the conditions on the data transmission from the copying machine by remote control performed by the external apparatus.

Figure 13:
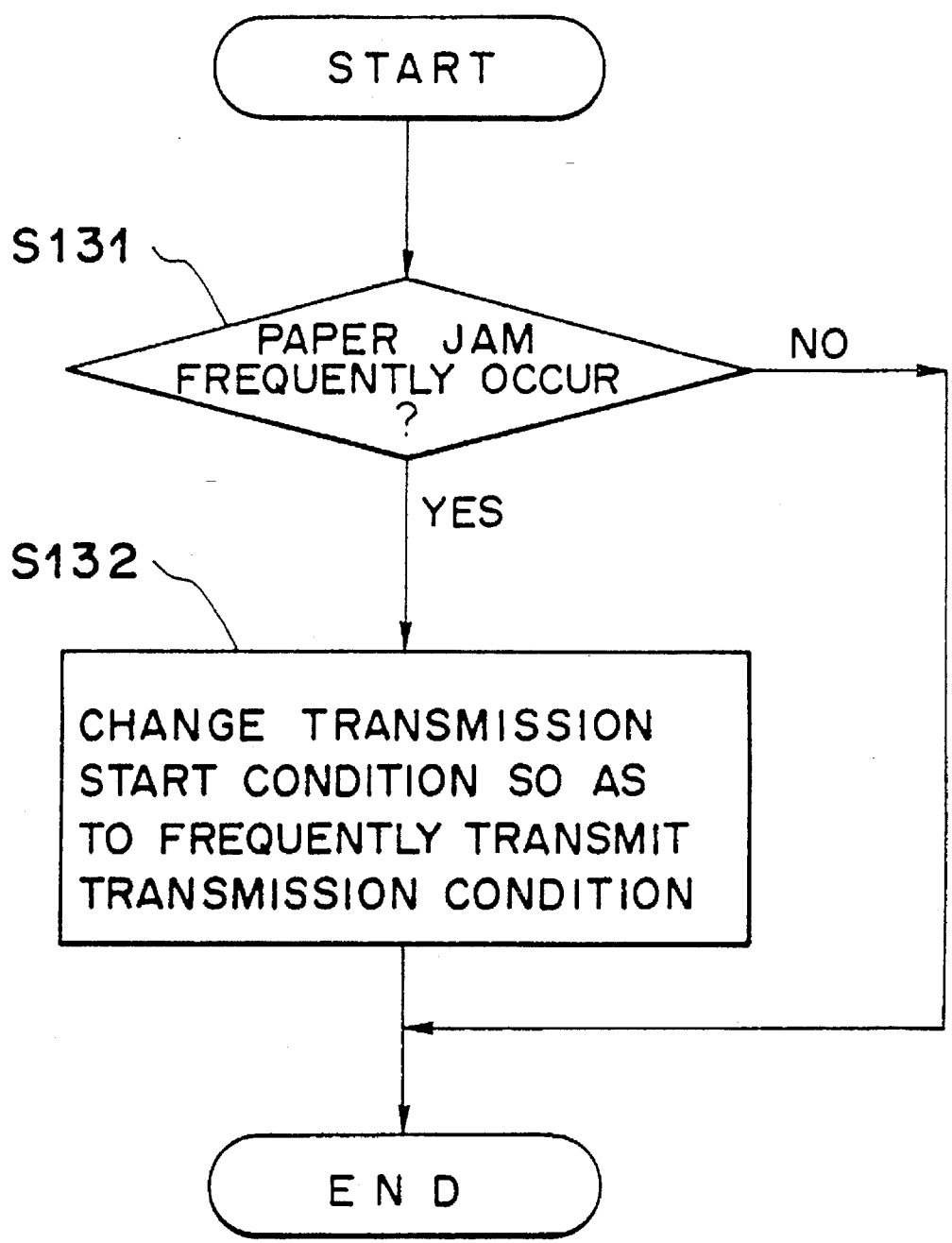
FIG. 13 is an operational flow chart according to the eighth embodiment.

FIG. 13 is an operational flow chart for the eighth embodiment for modifying the transmission starting conditions in accordance with the state of the copying machine.

In step S131, if it is determined that there is a need for an operational control section or the like to monitor the copying machine precisely by use of the discriminating function provided for the aforementioned CPU 801 to detect a frequent occurrence of paper jamming during the copying operation, presence of an abnormality, unavailability of toner, and other operating conditions of the copying machine, then the process proceeds to step S132 to cause the CPU 801 to transmit signals to the RAM 803 to modify the stored transmission starting conditions so that the periodical reporting can be transmitted more frequently, once a week instead of once a month, for example. In this case, it is assumed that the data transmission conditions are stored as given below for the normal operating state of the copying machine and for the occurrence of abnormal conditions being detected, respectively.

Normal operating state:
  at any time abnormality is detected.
  when paper jam takes place ten times per 100 copies.
  on 25th day of every month.
Occurrence of abnormal conditions detected:
  at any time abnormality is detected.
  when paper jam takes place twice per 50 copies.
  on Friday of every week.

These two kinds of data transmission conditions are stored, and in accordance with the result of the detection by the CPU 801 of the copying machine 100, the switching between these two data is conducted.

With the above-mentioned operations, it is possible to start data transmission in accordance with the operational state of the copying machine 100.

Thus, the copying machine is operated under the control of the copy controlling means while the data transmission and reception can be performed by the communication controlling means by connecting the communication lines with the external apparatus installed in an operational control section or the like.

Then, the transmission starting conditions for transmitting data to the external apparatus are stored in the transmission condition storage means. When the stored transmission starting conditions are met, the data to be transmitted are transferred from the copy controlling means to the communication controlling means for the automatic transmission to the external apparatus.

The transfer means makes it possible to rewrite the transmission starting conditions by transferring the data received by the communication controlling means to the transmission condition storage means.

As described above, it is possible to modify the setting of the transmission starting conditions of the data to be transmitted from the copying machine to the external apparatus in accordance with the operational state of the copying machine. Therefore, the operational control section or the like can collect the operating condition of the copying machine, functional state of the copying machine, occurrence of abnormalities, and the like as required at any time reliably and efficiently. Hence making prompt and effective control and making corrective actions possible for the operation of the copying machines.

Subsequently, a description will be made of the control of automatic data transmission to the external apparatus installed in an operational control section or the like at the time of the periodical communication predetermined for a characteristic copying machine embodying the present invention, or at the time of occurrence of specific events or conditions.

Figure 14:
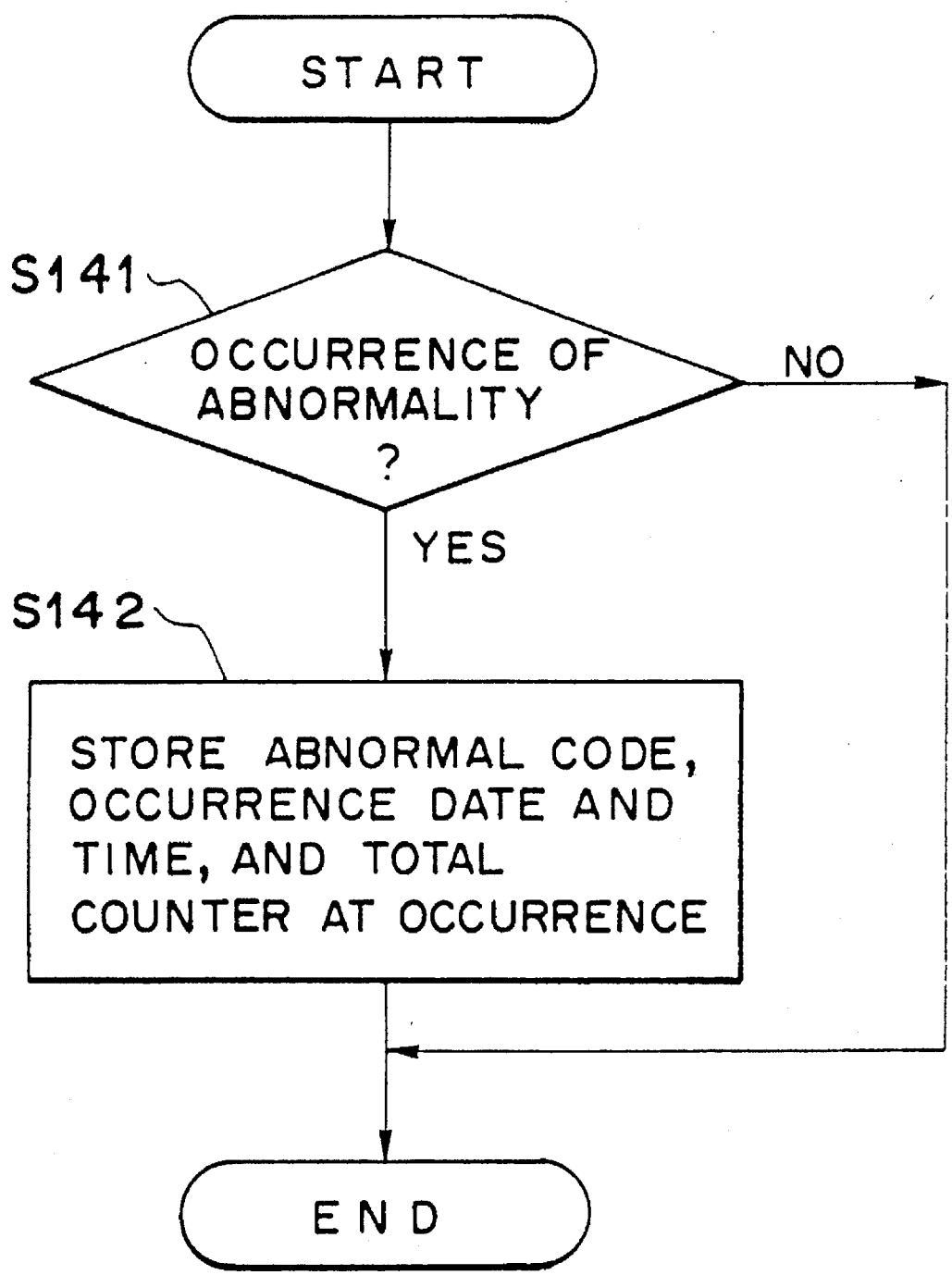
FIG. 14 is a flow chart showing the data storage accumulation according to the ninth embodiment.

FIG. 14 is a flow chart for data storage accumulation according to the ninth embodiment. FIG. 15 is an example of a table of the historical abnormality occurrences.

In step S141, if any abnormality takes place with respect to the copy controlling means of the copying machine, the process proceeds to step S142 to increment an abnormality counter and at the same time to store such abnormality in order to record its history. As an example shown in FIG. 15, the historical record of the abnormality includes not only the abnormality code but also data and time of the abnormality occurrence, and the total counter value of copies at the time of the abnormality occurrence, and these data are additionally stored in the aforementioned data storage means RAM 803 for accumulation. Thus, when any abnormality or paper jamming occurs or a request is made for data transmission at the time of periodical reporting, the data including these historical records are transferred to the communication controller 900 for transmission from the communication controller 900 to the external apparatus installed in an operational control section or the like connected therewith through the public circuit 908 or others. In this respect, it may be possible to delete the oldest history of abnormality when the number of the data of abnormality history exceeds ten.

With the above-mentioned control, the data regarding the copy controlling means and the information related to such data can be stored in the data storage means for accumulation and transmission to the external apparatus.

Figure 16:
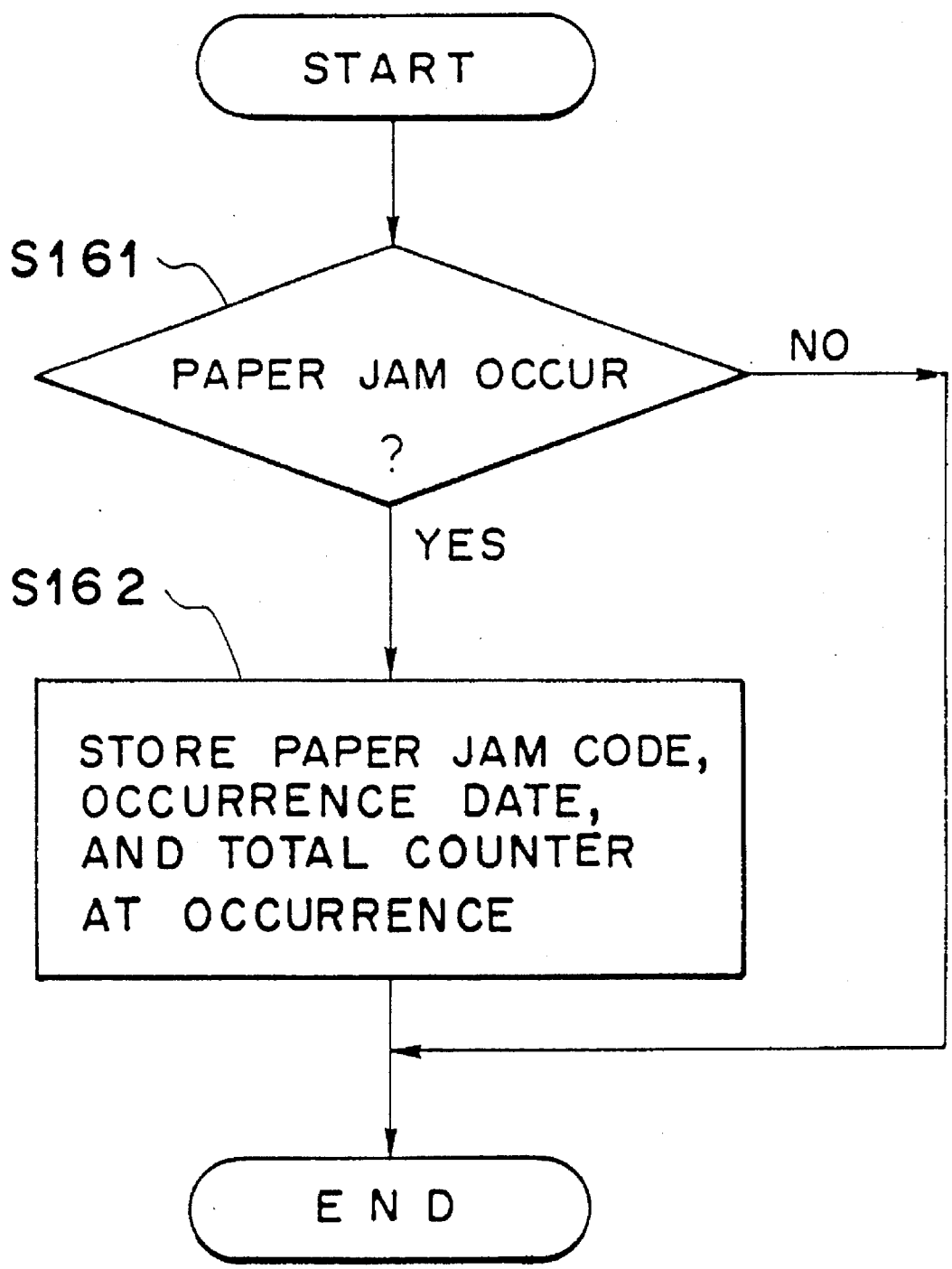
FIG. 16 is an operational flow chart according to the tenth embodiment.

FIG. 16 is an operational flow chart for the tenth embodiment. FIG. 17 is an example of a history table for paper jamming.

In step S161, if there occurs a paper jamming phenomenon in the copying operation of the copying machine, the process proceeds to step S162 to increment the paper jam counter and at the same time to store this paper jam for accumulation of its historical records. As an example shown in FIG. 17, the historical record of the paper jam includes not only the paper jam code but also the date and time of the paper jam occurrence, and the total counter value of copies at the time of the abnormality occurrence, and these data are additionally stored in the aforementioned data storage means RAM 803 for accumulation. Thus, when any abnormality or paper jamming occurs or a request is made for data transmission at the time of periodical reporting, the data including these historical records are transferred to the communication controller 900 for transmission from the communication controller 900 to the external apparatus installed in an operational control section or the like connected therewith through the public circuit 908 or others. In this respect, it may be possible to arrange the structure so that the oldest history of paper jam can be deleted when the number of the data of paper jam history exceeds ten.

With the above-mentioned control, the paper jam history can be stored for accumulation, and transmitted to the external apparatus.

Figure 18:
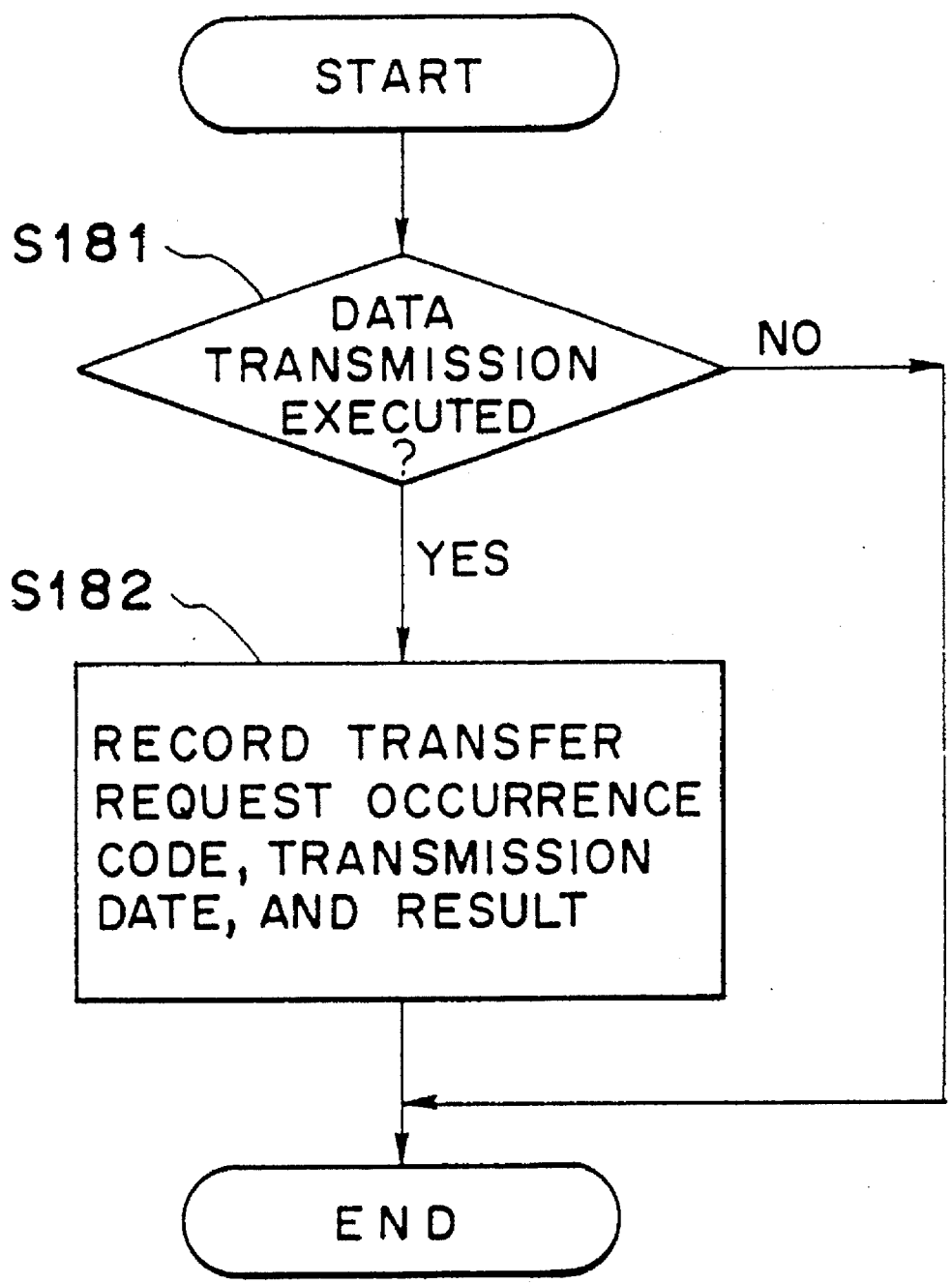
FIG. 18 is an operation flow chart according to the eleventh embodiment.

FIG. 18 is an operational flow chart for the eleventh embodiment. FIG. 19 is an example of a table showing the historical records of data transmission. When there is an abnormality occurrence, paper jam occurrence, or a request for data transmission to the external apparatus due to a periodical report or the like, resulting in the execution of data transmission in step S181, the process proceeds to step S182 to store the transmitted data from the copying machine in the storage means RAM 803 for the accumulation of the historical records of data transmission.

As an example shown in FIG. 19, the data transmission history is stored in the aforementioned storage means RAM 803 with the transmission data and time, kind of transmission, and result, and the data including such historical data are transmitted. Here, the kind of transmission means the kind of transmission conditions which has necessitated the request for a specific transmission. It is coded as given below for its storage.

| For an abnormality occurrence | 1 |
| For a paper jam occurrence | 2 |
| For a periodical report | 3 |

Also, for the result to be stored, 0 is given when the data transmission is normally completed and 1 is given otherwise. In this respect, it may be possible to transmit any transmission history with the information of the contents of the transmission at the time of the current transmission simultaneously.

The above-mentioned data transmission histories are stored up to ten histories, and the oldest history will be deleted when the stored number exceeds ten.

In this way, the copying machine performs copying under the control of the copy controlling means. Also, it is possible for the communication controlling means to perform the transmission and receiving to and from the external apparatus installed in an operational control section or the like for the transmission and reception of data by connecting the communication lines therewith.

Then, in the data storage means provided for the copying machine, data regarding the copy controlling means and information related to such data are stored for accumulation, and by the transfer means, the contents stored in the data storage means are transferred from the copy controlling means to the communication controlling means. Thus, the accumulated data regarding the copy controlling means and related information thereto are transmitted to the external apparatus by the communication controlling means.

As described above, the accumulated data regarding the copy controlling means and related information thereto are transmitted from the copying machine to the external apparatus simultaneously. Therefore, it is possible for the external apparatus to collect the abnormal conditions of the copying machine, data on its functions and peripheral information such as historical records efficiently even by the periodical reports from the copying machine only. Accordingly, the functional state of the copying machine, information regarding abnormality occurrence, and others can be collectively secured exactly, making it possible to implement an appropriate and prompt control of and corrective measures for the copying machines.

Subsequently, the description will be made of another embodiment.

The RAM 803 is structured to store the control data regarding the copy controlling means as the control data to be transmitted to the external apparatus 999 by separating them into the common control data which can be shared irrespective of the kinds of copying machines and the proper control data which are peculiar to a particular copying machine concerned.

Also, in the above-mentioned control data stored in the control data storage means RAM 803, there is registered a relative address from the head address of the common control data to be transmitted.

Figure 20:
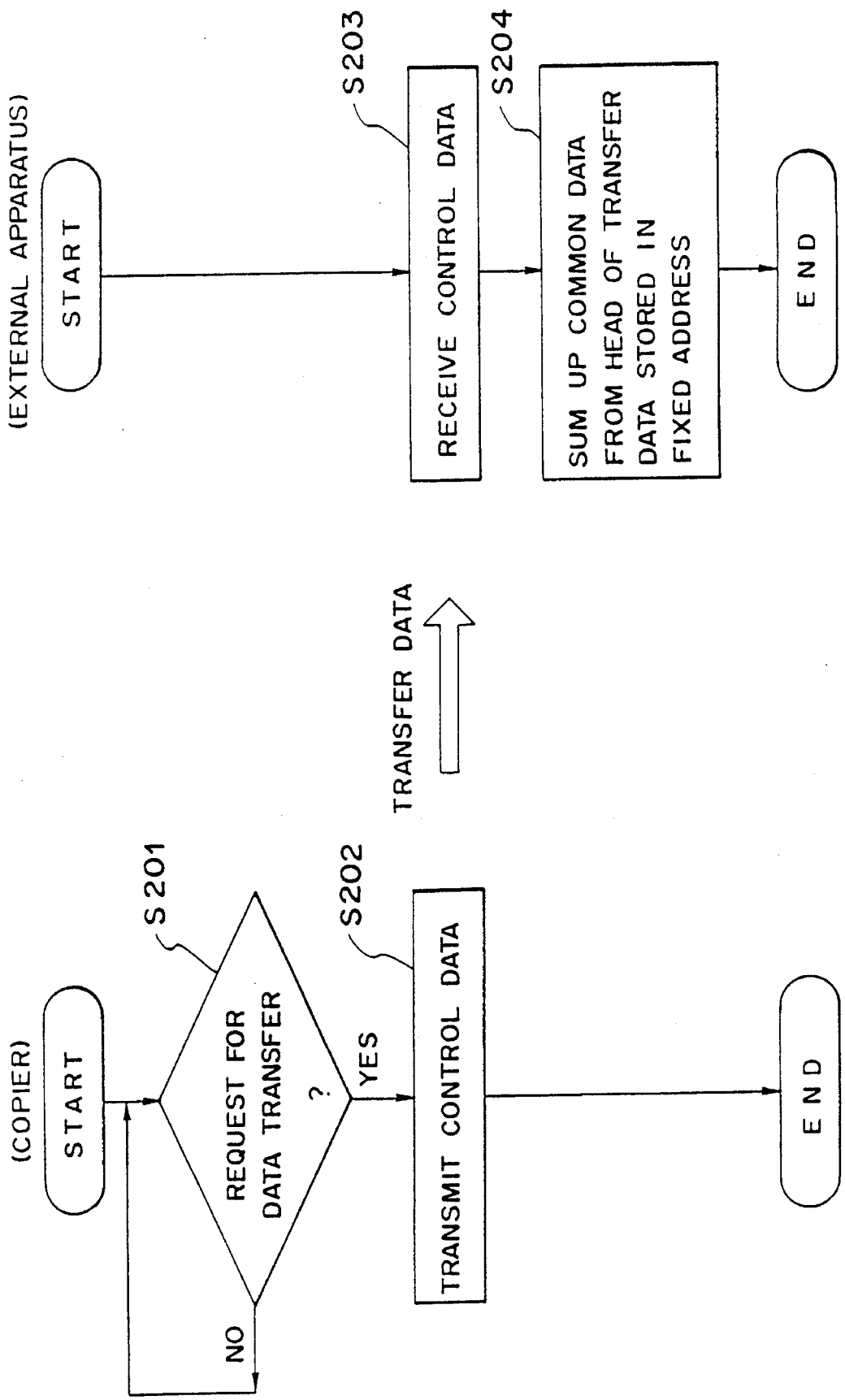
FIG. 20 is a control data transmission flow chart according to the twelfth embodiment.

FIG. 20 is a control flow chart for the control data transmission according to the twelfth embodiment, in which the controlling flow of the copying machine 100 which transmits its control data and the controlling flow of the external apparatus 999 installed in an operational control section or the like which receives the control data are stated together. FIG. 21 is an address map showing an example of the addresses from the head of the transmitting data according to the twelfth embodiment.

In step S201, if there occurs a request for the transmission of control data from the copying machine 100 to the external apparatus 999 due to the abnormality occurrence, the necessity of the periodical report, the paper jam occurrence, or the like, all the control data regarding the copy controller 800, which are stored in the control data storage means RAM 803 separately as common control data and as proper control data peculiar to a copying machine 100 as shown in FIG. 21, are transferred to the communication controller 900 through the RS-232C interfaces 805 and 907. In this case, the relative address from the head of the transmitting data for the common control data is fixed at 0100H irrespective of the kinds of the copying machine 100. Also, the order in which the common data are arranged is fixed, and in step S202, they are transmitted to the external apparatus 999 by the control of the communication controller 900 through the communication lines 908.

In step S203, the external apparatus 999 receives the above-mentioned control data from the copying machine 100. Then, the process proceeds to step S204 to enable the operational control section to perform the data collection and sum up using a common software for the common control data received from a plurality of copying machines irrespective of the kinds thereof.

In the twelfth embodiment, addresses from 0000H to 00FFH are fixed as the communication header portion, 0100H to 04FFH, for the common data area, and 0500H and on, for the area set aside for the proper control data peculiar to each of the copying machines. In this respect, the communication header portion means an area for the data to be used when the entire size of the transmitting data, ID numbers of the copying machines, and the like are transmitted. Also, the common control data mean the control data common to most of the copying machines such as sheet feeding number for each of the sheet supply cassettes, and copying number of the both-face multi mode. The proper control data mean the data peculiar to a copying machine such as the counting value of paper jams at each part of the copying machine, and the contents of its I/O ports.

FIG. 22 is a control flow chart for the control data transmission according to the thirteenth embodiment, in which the controlling flow of the copying machine which transmits its control data, and the external apparatus which receives the control data, are stated together. FIG. 23 is an address map showing the head of the transmitting data according to the thirteenth embodiment.

In step S221, if there occurs a request for the transmission of control data from the copying machine to the external apparatus due to the abnormality occurrence, the necessity of the periodical report, the paper jam occurrence, or the like, all the control data regarding the copy controller, which are stored in the control data storage means RAM 803 separately as common control data and as proper control data peculiar to a copying machine as shown in FIG. 23, are transferred to the communication controller 900, and in step S222, they are transmitted to the external apparatus 999.

At this juncture, the relative addresses from the head of the transmitting data for the common control data and proper control data are added to the communication data header portion. Therefore, it is possible for the operational control section, which receives the data, to execute its control operations such as the collection and sum up of the data by use of a common software with respect to the common control data.

In the thirteenth embodiment, addresses from 0000H to 00FFH are fixed as the communication header portion, 0100H to 04FFH, for the common data areas, and 0500H and on, for the area set aside for the proper control data peculiar to each of the copying machines. In this respect, the communication header portion means an area for the data to be used when the entire size of the transmitting data, ID numbers of the copying machines, and the like are transmitted. Also, the common control data mean the control data common to most of the copying machines such as sheet feeding number for each of the sheet supply cassettes, and copying number of the both-face multi mode. The proper control data mean the data peculiar to a copying machine such as the counting value of paper jams at each part of a copying machine and the contens of its I/O ports.

In this way, the copying machine operates copying under the control of the copy controlling means, and the data transmission and reception can be performed by the control of the communication controlling means by connecting the communication lines with the external apparatus installed in an operational control section or the like.

In the data storage means provided for the copy controlling means, the control data regarding the copy controlling means are stored by separating them into the common control data and proper control data, peculiar to each of the copying machines, irrespective of the kinds of the copying machine. In this respect, the relative address from the head address of the transmitting data is registered for the common control data to be transmitted.

Thus, the control data stored in the control data storage means are transferred by the transfer means from the copy controlling means to the communication controlling means and then transmitted to the external apparatus by the communication controlling means.

For the operational control section or the like, which receives the above-mentioned control data from a plurality of copying machines, it is possible to execute its control operation such as the collection of the control data received from the plural copying machines and its sum up easily and promptly using a common software, not each different software for each different kind of copying machine. It is also possible to collect the operational conditions, functional states, and other data of plural copying machines as well as the historical records efficiently for the execution of its exact control.

Subsequently, the description will be made of another embodiment.

The copy controller 800 and the communication controller 900 are capable of storing with its CPU, memories and its program incorporated therein a plurality of connecting information such as telephone numbers, communication preferences, connection procedural information (program) for making connection with the external apparatus, and are also structured to communicate with a plurality of parties selected by connection based on the these pieces of stored information.

Figure 24:
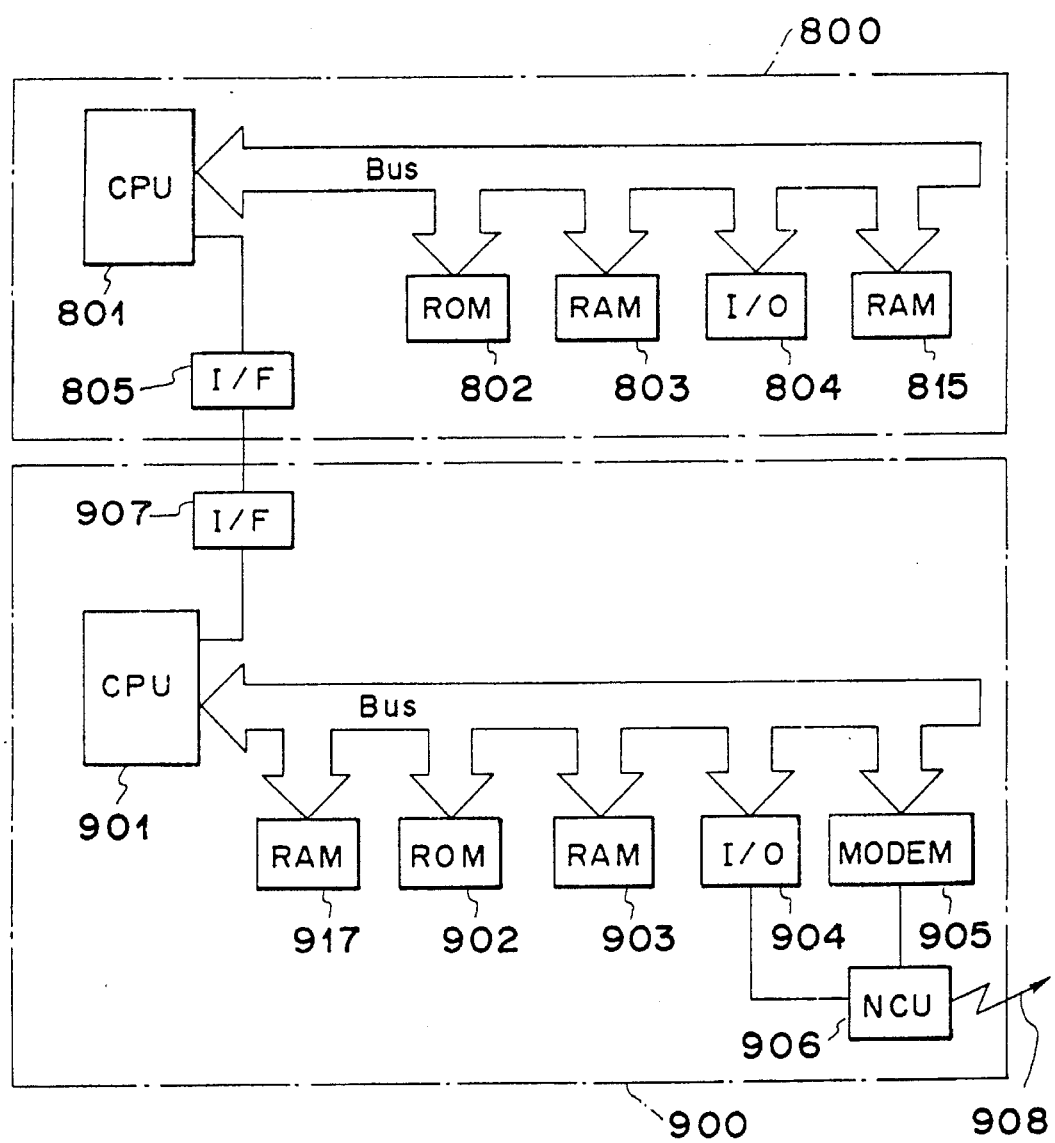
FIG. 24 is a block diagram showing a controlling unit.

FIG. 24 is a view showing the details of the copy controller 800 and the communication controller 900.

A reference numeral 815 designates storage means (back up RAM) for storing the connection information such as telephone numbers including the communication preferences for a plurality of external apparatuses which are expected destinations of communications and connection procedural information (program).

Also, the communication controller 900, which controls communication with the external apparatus through the external communication lines 908, performs its communication controls by the CPU 901. A reference numeral 902 designates a memory (ROM) for storing the communication control and connection procedural programs, and others; 917, a storage means (back up RAM) for storing the connection information such as telephone numbers including the communication preferences for a plurality of external apparatuses which are expected destinations of communications and connection procedural information (program).

Thus, the copy controlling means 800 and communication controlling means 900 have functions to enable the storage means to record the connecting information and information regarding connecting means for a plurality of external apparatuses as well as to transfer those pieces of information.

The other structures of the copy and communication controllers shown in FIG. 24 are the same as those shown in FIG. 3.

Here, the structure is arranged so that the connecting information (telephone number and others) for the external apparatus are inputted into the memories by the operation of the asterisk key 601, ten keys 603, and the like. It may be possible to arrange the structure so that on the inner side of the operation panel 600, input keys and registration keys are provided for the connecting information (telephone number and others) regarding the external apparatus (not shown).

Subsequently, the description will be made of the connection with a characteristic external apparatus 999 embodying the present invention.

Figure 25:
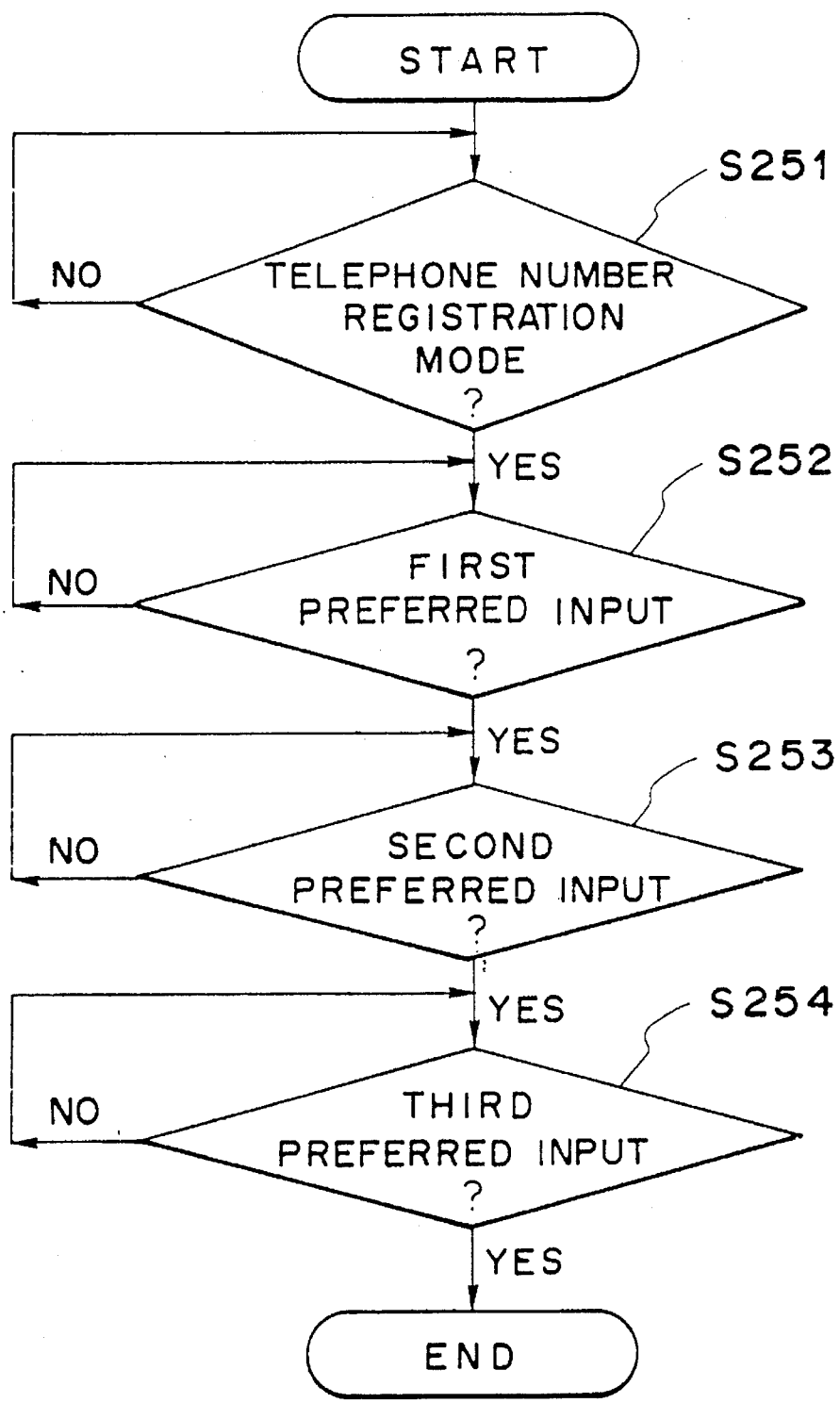
FIG. 25 is a flow chart showing the connection information input.

FIG. 25 is a flow chart for inputting into the storage means three connection information (telephone numbers) by giving preferences thereto.

When the telephone number registration key (not shown) on the operation panel is depressed, the main body of the copying machine is shifted to enter the telephone number registration mode (step S251) for performing the connection registrations. In the present embodiment, it is possible to input a maximum of three telephone numbers for the respective external apparatuses with preferences. In this mode, the user inputs the telephone number of the external apparatus to be communicated with the main body of the copying machine with the first preference and stores such a telephone number by depressing the registration key (step S252).

Likewise, the telephone numbers of the second and third preferences are inputted for storage (step S253 and step S254).

If the input of the telephone numbers for the three locations and its storage are terminated at the time the registration key is depressed, the telephone number registration mode is released. In this respect, the inputted contents are stored in the back up RAMs 815 and 917.

On the basis of the connecting information stored by the above-mentioned input operations, automatic connections are performed sequentially in accordance with the preferential orders thus given.

Figure 26:
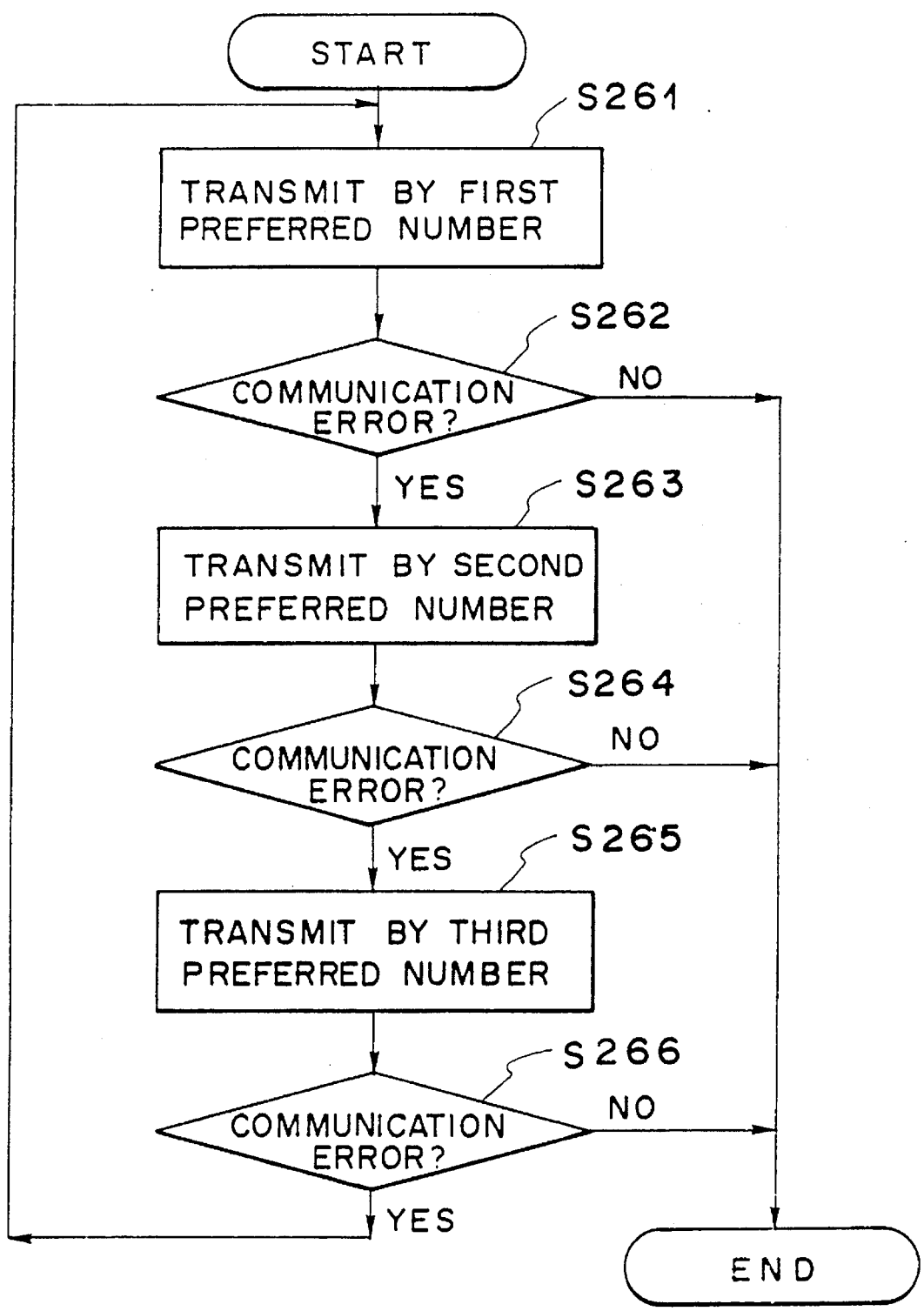
FIG. 26 is a communication flow chart according to the fourteenth embodiment.

FIG. 26 is a communication flow chart for the copying machine in which the aforementioned preference orders are registered according to the fourteenth embodiment.

In communicating with the external apparatus 999, the CPU 801 in the copy controller 800 informs the CPU 901, in the communication controller 900, of its start of communication. The CPU 901 transfers the information regarding the information means with respect to the external apparatus having the first communication preference from the back up RAM 917 to the RAM 903. On the basis of such information, the communication with the external apparatus is started by the communication controlling means 900 (step S261).

During communication, the communication state is being monitored by the CPU 901.

However, in such a case that although a communication time is reached, no connection is possible because the communication with the external apparatus having the first communication preference is still engaged or because the communication has been terminated incompletely by the occurrence of a communication error (step S262), the CPU 901 transfers the information regarding the communication procedure with the external apparatus having the second communication preference from the back up RAM 917 to the RAM 903 and starts communication (step S263). If the party having the second communication preference is also in a disabled state to execute the communication or there is the occurrence of communication error, making it impossible to execute communicating on the predetermined contents (step S264), the connection is made to the party having the third communication preference in the same manner as above (step S265).

In other words, the connecting operations with the external apparatuses at the communication destinations are sequentially conducted in accordance with the communication preference orders.

As described above, the connecting operations are sequentially executed automatically with a plurality of the external apparatuses in accordance with the preferential orders which are inputted in advance.

Figure 27:
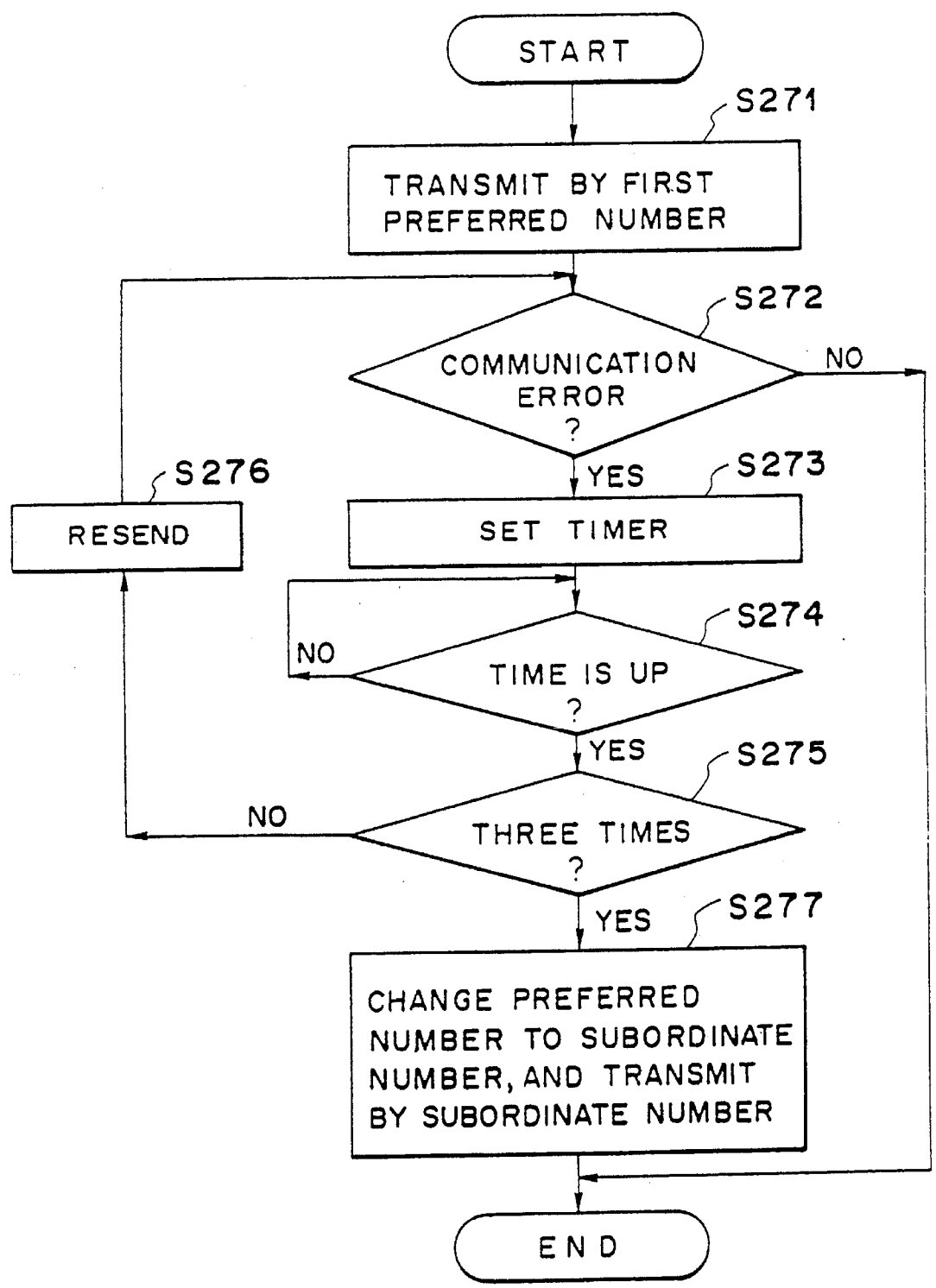
FIG. 27 is a communication flow chart according to the fifteenth embodiment.

FIG. 27 is a communication flow chart according to the fifteenth embodiment.

In the present embodiment, the communication procedure is repeated in plural numbers for one external apparatus until a disabled communication is released. Now, there is provided a function that the communication preferential order is modified if no connection is possible after a predetermined number of repetitions.

In communicating with the external apparatus, the CPU 801, in the copy controller 800, informs the CPU 901, in the communication controller 900, of the start of communication. The CPU 901 transfers the information regarding the communication procedures for the external apparatus having the first communication preference from the RAM 917 to the RAM 903 (step S271).

During the communication, the communication state is being monitored by the CPU 901.

However, if the communication with the external apparatus having the first communication preference is terminated incompletely (step S272), the CPU 901 actuates the timer (step S273) and stays at standby until the timer value reaches a predetermined value (step S274). Then, after the passage of the predetermined time, the CPU 901 resumes its communication with the external apparatus having the first communication preference (step S275 and step S276). The above-mentioned operations are repeated for predetermined times.

If the communications for the predetermined times are totally disabled, the preference order is modified and inputted as the lowest preferential order. Then, the communication with the external apparatus having the next highest preferential order is started (step S277).

As described above, it is possible to carry out the communicating operations for a plurality of external apparatuses in accordance with the preferential orders, and by lowering the preferential order of the party with which the communication cannot be executed satisfactorily, the communications can be conducted efficiently.

Figure 28:
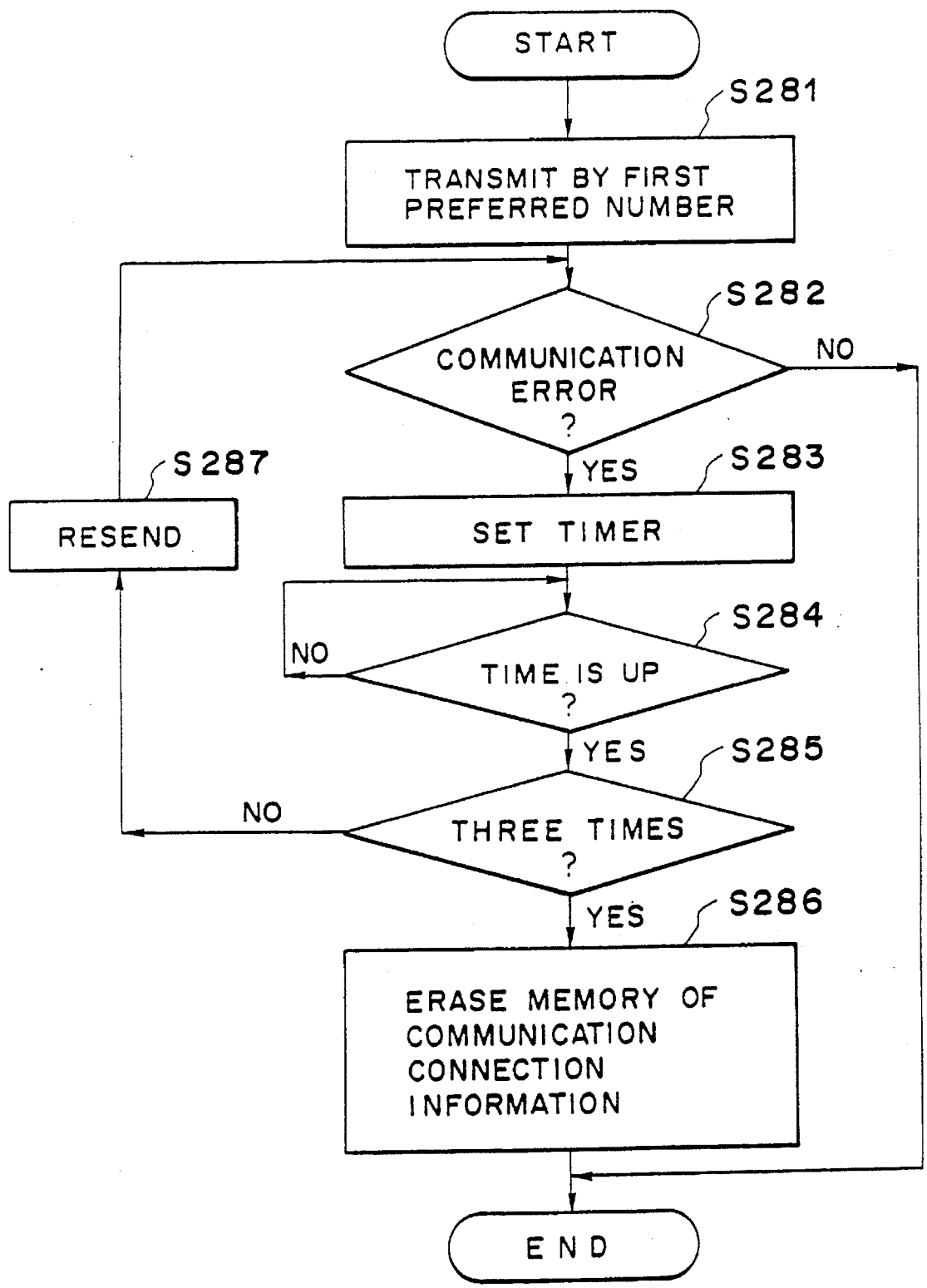
FIG. 28 ms a communication flow chart according to the sixteenth embodiment.

FIG. 28 is a communication flow chart for the sixteenth embodiment in which a function is provided for erasing the storage of connecting information with a specific communicating destination.

In communicating with the external apparatus 999, the CPU 801, in the copy controller 800, informs the CPU 901, in the communication controller 900, of the start of communication. The CPU 901 transfers the information regarding the communication procedures for the external apparatus having a higher preferential order from the RAM 917 to th RAM 903 and starts communication with the external apparatus on the basis of such information (step S281).

During the communication, the communication state is being monitored by the CPU 901.

However, if the communication with the external apparatus 999 having the first preferential order is terminated incompletely (step S282), the CPU 901 actuates the timer (step S283) and stays at standby until the timer value reaches a predetermined value (step S284). Then, after the passage of the predetermined time, the CPU 901 resumes the communication with the external apparatus 999 (step S285 and step S286). The above-mentioned operations are repeated for the predetermined time.

If the predetermined times of communications are all terminated incompletely, the information regarding the communication means for the external apparatus 999, the communication with which has failed, is deleted from the RAM 917 and RAM 815. For the next communication and on, the communication with this external apparatus 999 is not conducted. The communication is conducted with the other external apparatus in accordance with the preferential order.

As described above, the storage of the connecting information for the external apparatus with which the communication cannot be carried out satisfactorily is automatically deleted, and from the next time, no communicating connection is made with such external apparatus, thus making it possible to conduct communications with the remaining external apparatuses efficiently. Also, it may be possible to store the connecting information for a new external apparatus.

In this way, the copying machine operates copying under the control of the copy controlling means. Also, the copying machine can communicate with the external apparatus installed in an operational control section or the like under the control of the communication controlling means for the transmission and reception of data through communication lines.

Then, in the registration means, the connecting information including the communication preferential orders and connecting procedural information for the connections with a plurality of external apparatuses is stored, and if a connection with a particular external apparatus is disabled for some reason or reasons, another communication with the other external apparatus can be executed in accordance with its preferential order as substituting means.

Also, it is possible to arrange the structure so that the communication preferential order for the external apparatus for which no communication can be executed even after repetition for predetermined times is automatically lowered or erased. Hence implementing communications with the external apparatuses in a better communication state at all times.

Then, with these functions, the operational control section, for example, can obtain She operational conditions of the copying machines up-to-date at all times and improve its user services.

Subsequently, the description will be made of the control whereby to transmit data automatically to the external apparatus installed in an operational control section or the like when there occurs the event or condition which is provided in advance for a characteristic copying machine embodying the present invention.

Figure 29:
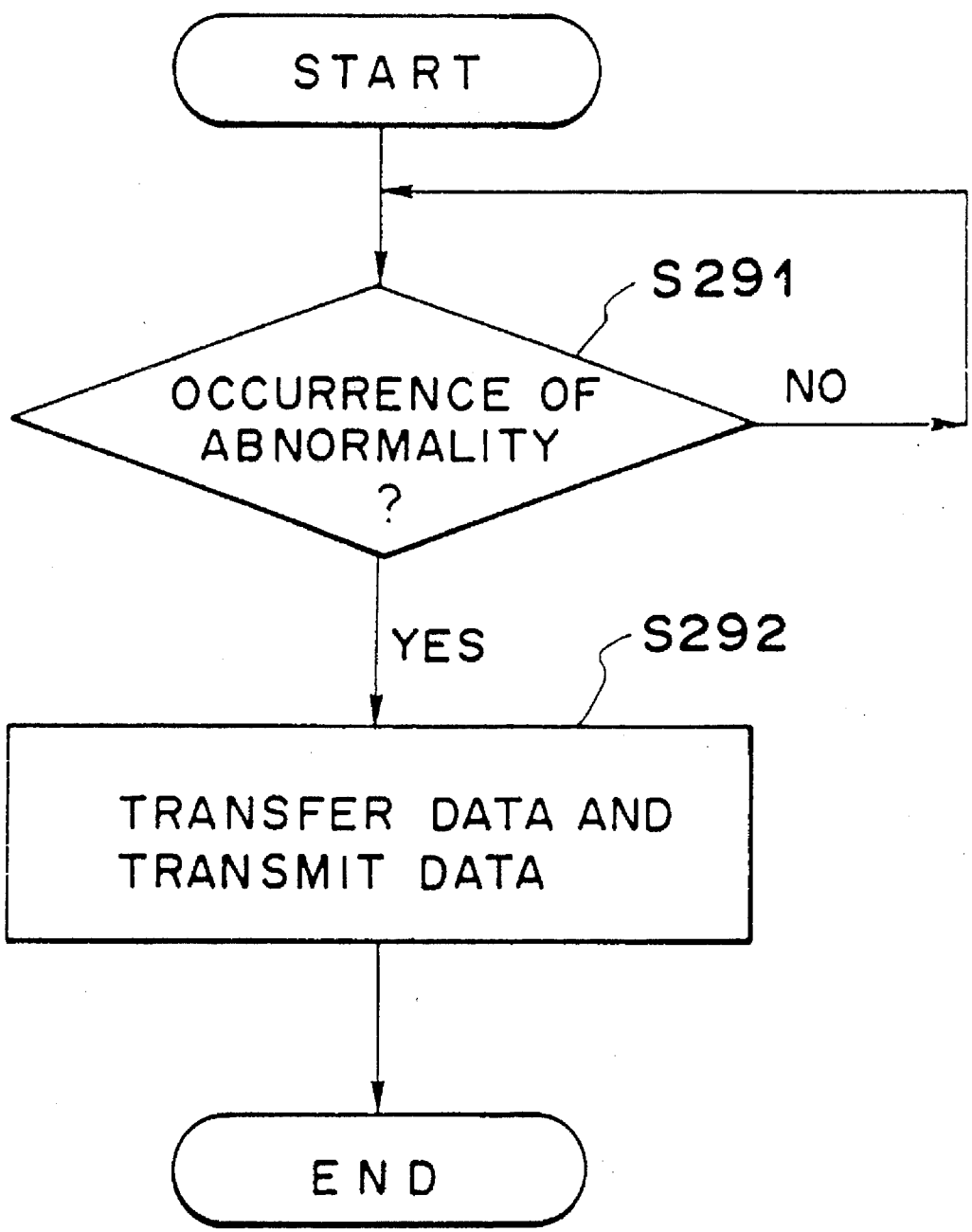
FIG. 29 is a transmission flow chart at the time of the abnormality occurrence according to the seventeenth embodiment.

FIG. 29 is a communication flow chart according to the seventeenth embodiment when abnormalities occur in a copying machine.

When the CPU 801, which serves as detection means detects high temperatures from a fixed temperature sensor connected to the I/O 804 of the main body of the copying machine or detects the locking of the motor 113, the CPU 801 serving as conditional detection means compares such a detected condition with the predetermined regulation state. Then, if any occurrence of abnormalities is detected, the process proceeds to step S291 to transfer the data regarding the abnormality occurrence from the CPU 801 to the communication controller 900 through the transfer means I/F 805 and I/F 907 for its transmission from the communication controller 900 to the external apparatus installed in an operational control section or the like through the communication lines 908.

In the transmitting data, the kinds of abnormalities, dates and times, machine numbers, and the like are included. Therefore, the operational controlling side of the copying machines can notice the occurrence of any abnormalities and its contents immediately and take corrective measures appropriately.

Figure 30:
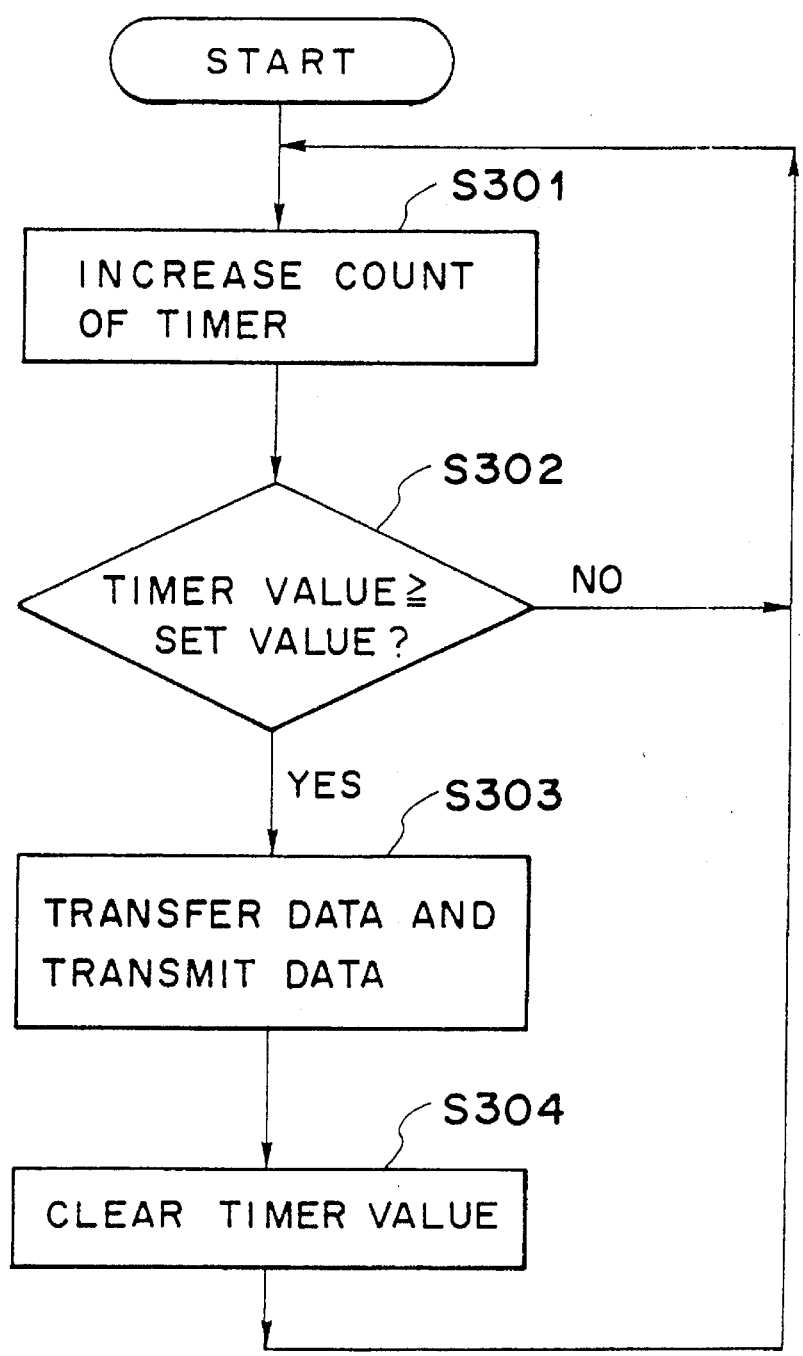
FIG. 30 is a flow chart showing the transmission per regular time according to the eighteenth embodiment.

FIG. 30 is a flow chart according to the eighteenth embodiment for transmitting data to an external apparatus for each of the regulated operational hours of a copying machine.

In step S301, the timer count is incremented by the CPU 801 in the copy controller, and in step S302, when the timer counting is detected to have reached a predetermined value of the regulated operational hours, the process proceeds to step S303 to transfer the data to the communication controller 900 for its transmission to the external apparatus 999. Then, the process will proceed to step S30h to reset the timer value to zero and return to the step S301.

As described above, the data transmission is automatically executed at each time the timer value reaches a regulated value of the time set in advance. As a results, the controlling side of the copying machines can collect and sum up the control data whenever each predetermined period of time elapses. Hence making efficient control and maintenance of the copying machines possible.

Figure 31:
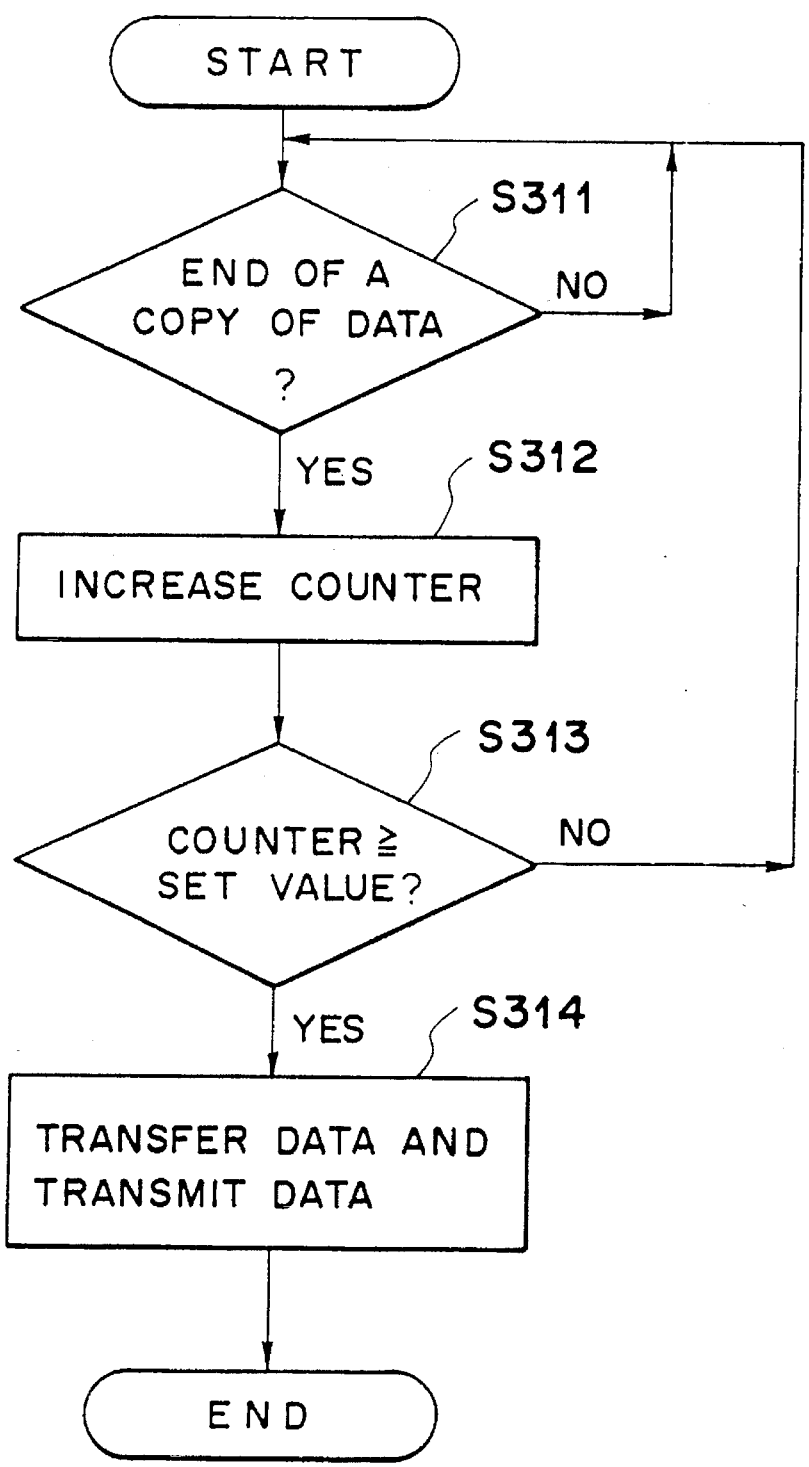
FIG. 31 is a flow chart showing the transmission per regular copy number according to the nineteenth embodiment.

FIG. 31 is a flow chart according to the nineteenth embodiment for transmitting data to an external apparatus for each of the regulated copy numbers.

In step S311, one copy is produced, the process proceeds to step S312 to increment the copying counter, and further to step S313. Then, when the counter reaches a predetermined value of the copy number, the process will proceed to step S314 to transfer the data to the communication controlling means for its transmission to the external apparatus by the communication controlling means.

As described above, the data transmission is automatically executed at each time the copy number reaches a predetermined value. As a result, the controlling side of the copying machines can collect and sum up the control data for each predetermined copy number. Hence making efficient and prompt control of the copying machines possible.

Figure 32:
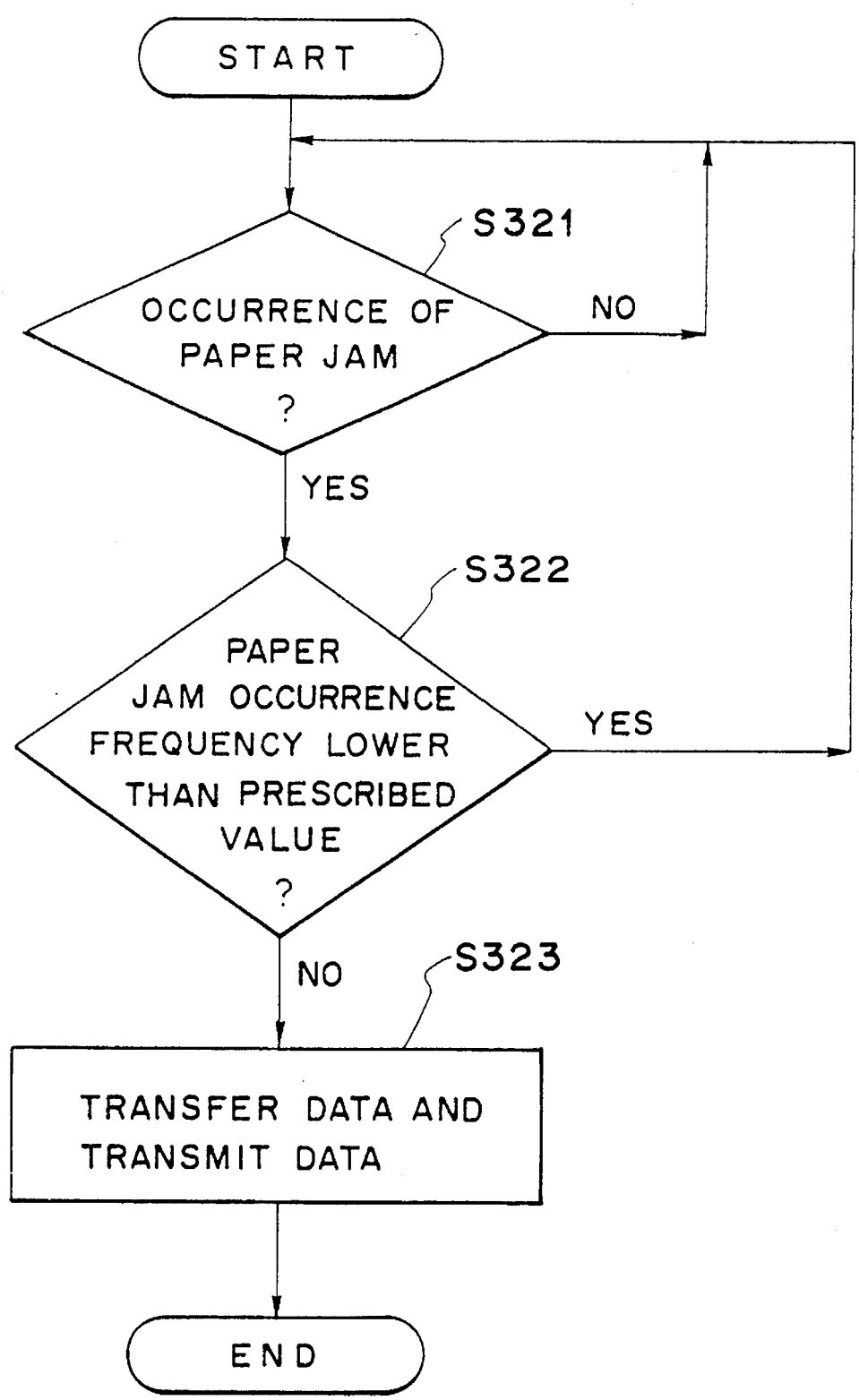
FIG. 32 is a flow chart showing the transmission on the basis of the jamming frequency of copying medium according to the twentieth embodiment.

FIG. 32 is a flow chart according to a twentieth embodiment for transmitting data regarding frequency of copy sheet Jamming occurrence.

In copying operation, if the Jamming of paper which is a copying sheet, is detected in step S321, the process proceeds to step S322. In the step S322, the CPU 801 serving as detecting means for the operational conditions examines the historical state of the copying machine on the basis of the paper jam occurrences in the past, and if it is found that the frequency of paper jam occurrences is higher than the regulated frequency thereof, the process will proceed to step S323 to transfer the data to the communication controller 900 for its transmission to the external apparatus 999.

As described above, it is possible for the section which operates the copy controlling apparatus to discriminate automatically a copying machine which tends to create the paper jam. Hence, making an appropriate corrective measures possible by making investigation when a periodical or temporary maintenance is performed.

Figure 33:
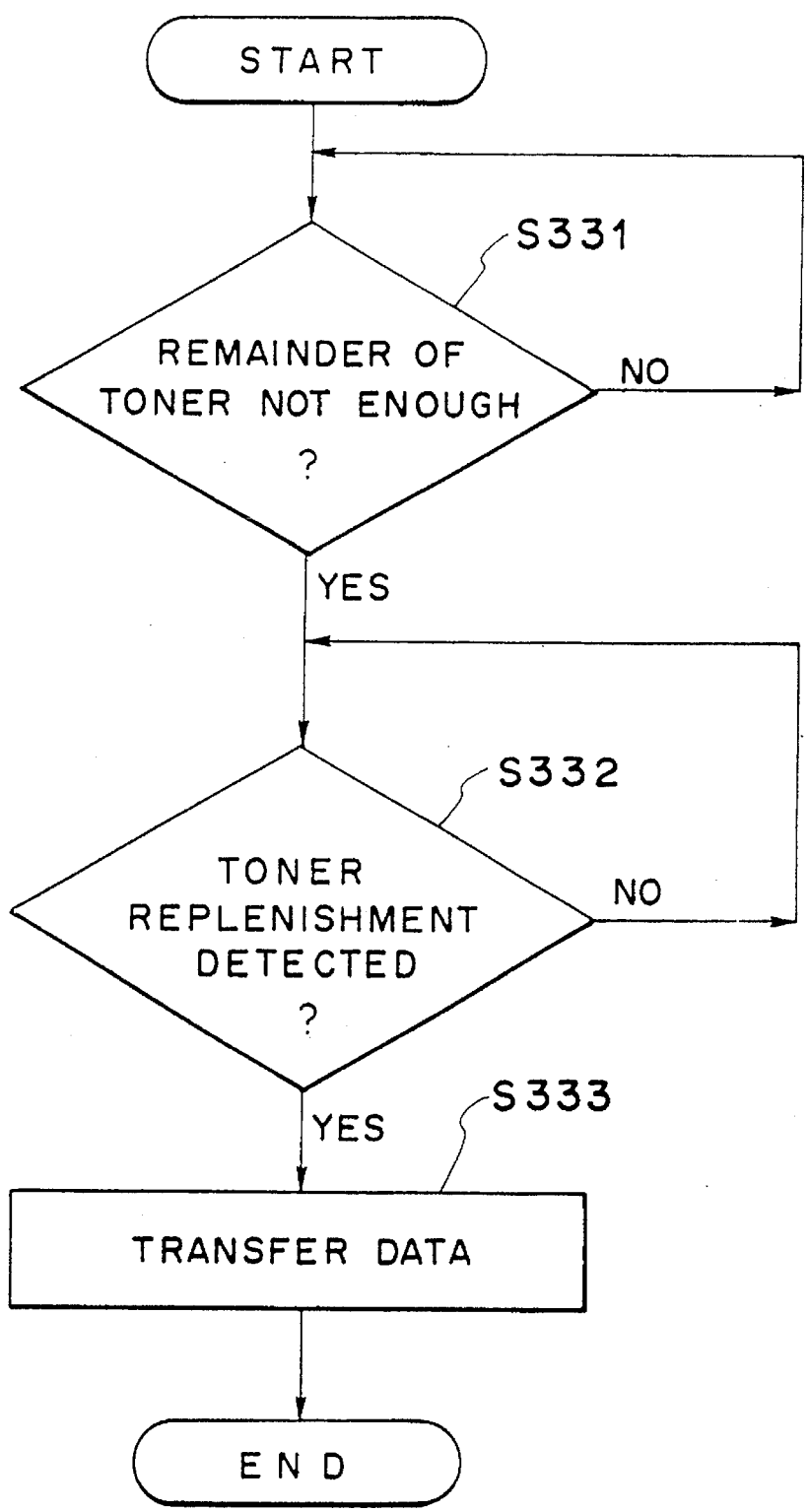
FIG. 33 is a flow chart showing the transmission per replacement or replenishment of expendables according to the twenty-first embodiment.

FIG. 33 is a flow chart according to the twenty-first embodiment for transmission on the basis of the replacement and/or replenishment of expandables.

When the CPU 801 in the copy controller 800 detects in step S331 that the remaining quantity of toner is insufficient in accordance with the input from the toner remainder sensor mounted at the I/O 804, the process proceeds to step S332, and then to step S333 when the user, noticing that the toner is now insufficient, replenishes it for the copying machine. Thus, the data is transferred to the communication controller 900 for its transmission to the external apparatus from the communication controller 900.

As described above, it is possible for the copying machine controlling side to know that the toner has been replenished, thus enabling arrangements of replenishment of the expendables and the like in advance. The flow charts shown in FIG. 29 through FIG. 33 for controlling the data transmissions can be combined in its implementation to make a more efficient control and maintenance possible.

In this way, the copying operation is performed under control of the copy controlling means, and also, under control of the communication controlling means, the transmission and reception can be operated for the transmission and reception of the data by connecting the communication lines with the external apparatus installed in an operational section or the like.

Then, when the condition detecting means detects that the copying machine is in a state or under condition to transmit its data as anticipated, the transfer means transfers the transmitting data from the copy controlling means to the communication controlling means for its transmission to the external apparatus from the communication controlling means. Thus, the occurrences of the anticipated state and conditions can be automatically informed to the operational control section or the like.

Also, the operational control section or the like can collect the operational conditions of the copying machine, functional state of and occurrence of abnormality or the like in the copying machine exactly and efficiently so that the control of the copying machines as well as the corrective measures can be taken appropriately and promptly.

Subsequently, another embodiment will be described.

Figure 34:
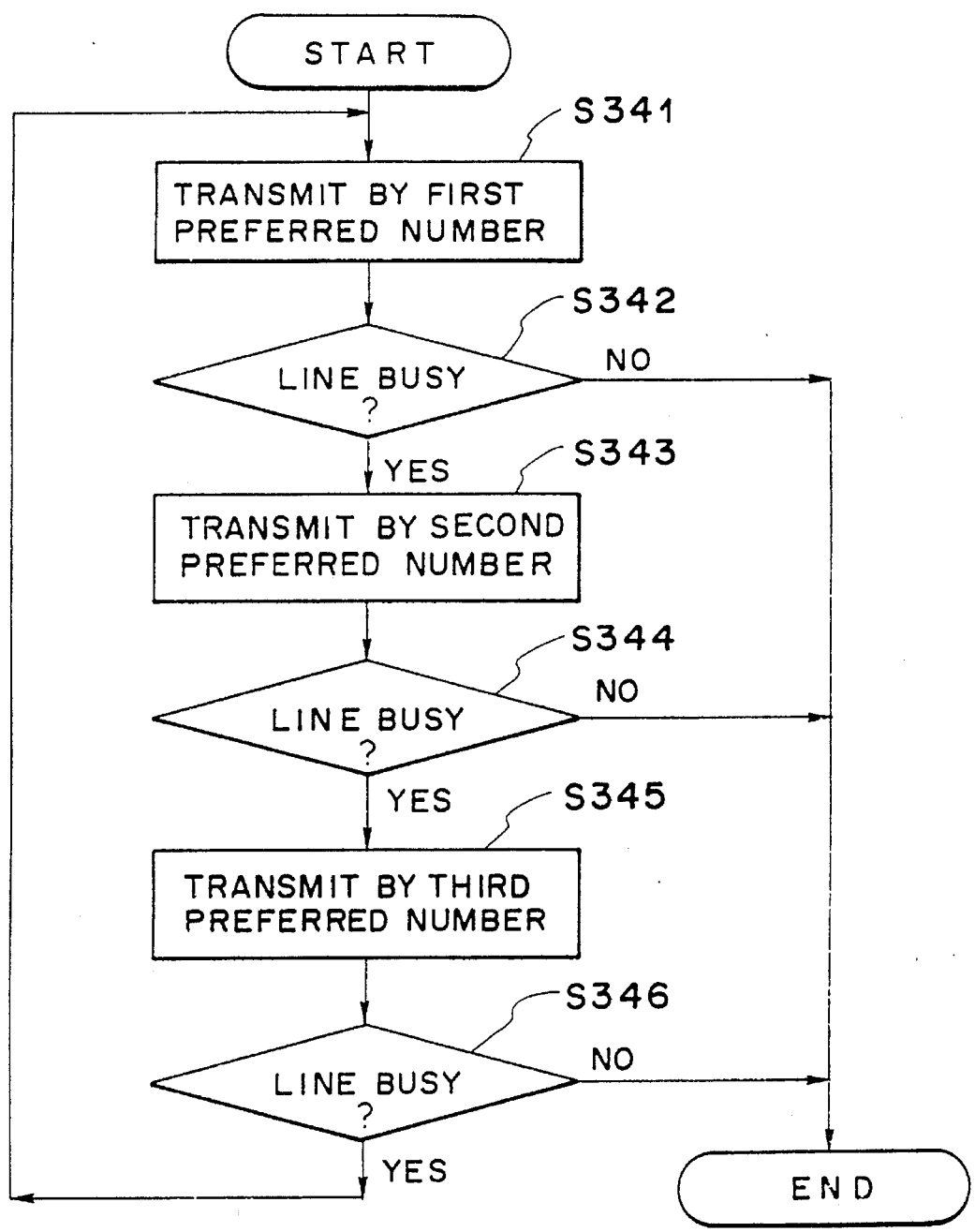
FIG. 34 is a communication flow chart according to the twenty-second embodiment.

FIG. 34 is a communication flow chart according to the twenty-second embodiment for the copying machine embodying the present invention in which the aforementioned registration is made with the preferential orders.

In communicating with an external apparatus, the CPU 801, in the copy controller 800, informs the CPU 901, in the communication controller of the start of communication. The CPU 801 transfers the information regarding the communication procedure for the external apparatus having the first communication preferential order from the RAM 803 to the RAM 903. On the basis of such information, the communication controller 900 starts communication with the external apparatus (step S341).

During the communication, the communication state is being monitored by the CPU 901.

However, in such a case where the communication is disabled with the external apparatus having the first communication preferential order when the communication time is given (step S342). The CPU 801 transfers the information regarding the communication procedure with an external apparatus having the second preferential order from the RAM 803 to the RAM 903 to start the transmission (step S343). If the second preferential destination is also engaged and the communication on the prearranged contents cannot be performed (step S344), the connection will be made with the third preferential destination in the same manner as above (step S345).

In other words, the connecting operations are conducted sequentially with the communicating external apparatuses in accordance with its communication preferential orders. When the communication with an external apparatus having the lowest communication preferential order is disabled, the communication operation will be attempted again with the external apparatus having the first preferential order.

As described above, the sequential connections are automatically performed with a plurality of the registered destinations in accordance with its preferential orders.

Figure 35:
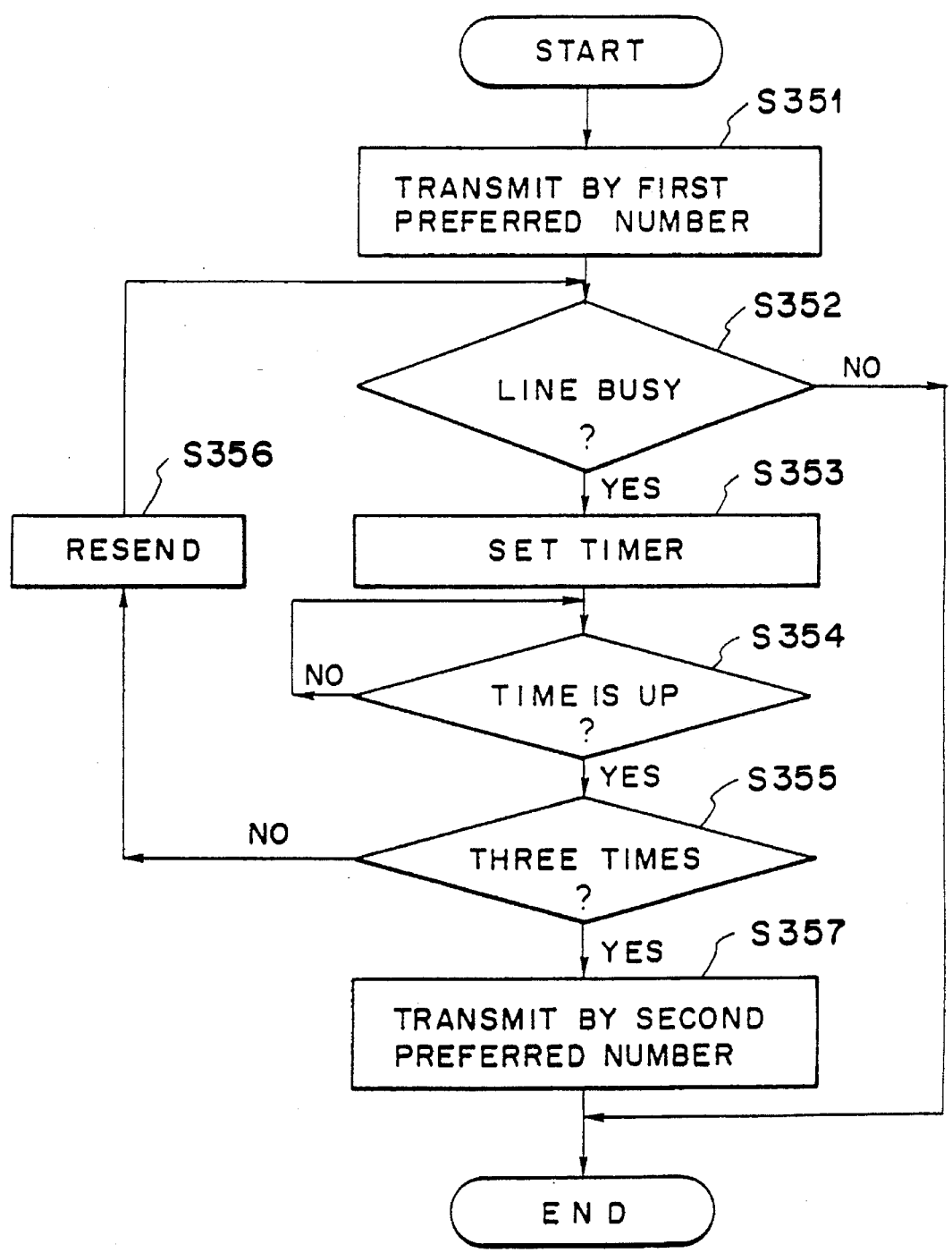
FIG. 35 is a communication flow chart according to the twenty-third embodiment.

FIG. 35 is a communication flow chart according to the twenty-third embodiment.

The present embodiment is provided with a function to repeat the communication procedure a plurality of times for one external apparatus until the disabled communication is released.

In communicating with an external apparatus, the CPU 801 in the copy controller 800 informs the CPU 901, in the communication controller 900, of the start of the communication. The CPU 801 transfers the information regarding the communication procedure for the external apparatus having the first preferential order from the RAM 803 to the RAM 903. On the basis of such information, the communication with the external apparatus is started (step S351).

During the communication, the communication state is being monitored by the CPU 901.

However, if the communication with the external apparatus having the first preferential order is disabled (step S352), the CPU 901 actuates the timer (step S353) and waits until the timer value reaches a predetermined value (step S354). Then, when the predetermined time has elapsed, the CPU 901 resumes the communication with the external apparatus having the first preferential order. The operation described above will be repeated for predetermined times.

If all the communications for the predetermined times are disabled, the communication will be performed with an external apparatus registered with the second preferential order. In this respect, although not shown in FIG. 35, if the second preferential destination number is engaged as in the case of the aforementioned communication with the first preferential destination number, it may be possible to arrange the structure so that the connecting procedure can be taken for plural times in the same manner. The above-mentioned operations will be performed until the communication is completed.

Now, as described above, the sequential connecting operations are automatically performed with a plurality of the registered destinations in accordance with the preferential orders, and the connecting operation with the next high preferential destination is conducted only after the connection with the higher preferential destination has been attempted for plural times. As a result, the opportunity for connecting with the external apparatus having the higher preferential order becomes greater.

In this way, the copying machine operates copying under control of the copy controlling means. Also, the communication on the data transmission and reception, and others can be performed with the external apparatus installed in an operational control section and the like under control of the communication controlling means through the communication lines.

Then, in the registration means, a plurality of connecting information for performing the connection with the external apparatus and connection procedural information are stored, and if a plurality of connection registrations are made on the basis of the stored information, the sequential connections are automatically operated with a plurality of the connecting destinations in accordance with the registrations when communication lines with the external apparatus are congested. Thus, more opportunities can be secured to connect the communication lines. It is therefore possible to make the connection earlier for the efficient data transmission and reception.

The description has been made of the present embodiment, but it may be possible to count an accumulated number of copied sheets for transmitting the accumulated count value to the external apparatus. In this way, the number of use of the copying machine can be secured by the external apparatus side.

Also, the structure may be arranged to be applicable not only to the copying machines, but also to printers, facsimile, or other recording apparatuses.

What is claimed is:

1. An equipment controlling apparatus comprising:

first storage means for storing data indicating a state of an equipment;

inputting means for inputting a first telephone number and a second telephone number;

second storage means for storing the first telephone number and the second telephone number inputted by said inputting means;

communication means for communicating with a centralized control apparatus for controlling said data intensively; and controlling means for executing controls so that communication is performed with the second telephone number stored in said second storage means when the communication cannot be performed with the first telephone number stored in said second storage means.

2. An equipment controlling method according to claim 1, wherein said controlling means attempts communication with the second telephone number when communication cannot be performed with the first telephone number after communication with the first telephone number has been attempted for a predetermined number of times.

3. An equipment controlling apparatus comprising:

storage means for storing data indicating a state of an equipment;

communication means for communicating with a centralized control apparatus for controlling said data intensively; and controlling means for executing controls so that communication is performed with a second telephone number when the communication cannot be performed with a first telephone number, wherein when said communication is performed with the first telephone number after communication has been attempted for a predetermined number of times, said controlling means does not perform communication with the first telephone number thereafter.

4. An equipment controlling method comprising the steps of:

storing data indicating a state of an equipment;

inputting a first telephone number and a second telephone number;

storing the inputted first telephone number and the inputted second telephone number;

communicating with a centralized control apparatus for controlling said data intensively; and executing controls so that communication is performed with the stored second telephone number when the communication cannot be performed with the stored first telephone number.

5. An equipment controlling method according to claim 4, wherein, in said executing step, communication is attempted with the second telephone number when communication cannot be performed with the first telephone number after communication with the first telephone number has been attempted for a predetermined number of times.

6. An equipment controlling method comprising the steps of:

storing data indicating a state of an equipment;

communicating with a centralized control apparatus for controlling said data intensively; and executing controls so that communication is performed with a second telephone number when the communication cannot be performed with a first telephone number, wherein when communication is performed with the first telephone number after communication has been attempted for a predetermined number of times, said controlling has been attempted for a predetermined number of times, communication is not performed with the first telephone number in said executing step thereafter.

7. A method of controlling communication between an equipment and a centralized control apparatus located at a position apart from said equipment through a communication line, said method comprising the steps of:

storing data indicative of a state of the equipment;

communicating said data with said centralized control apparatus; and initiating communication of the stored data to said centralized control apparatus in response to a request for transmission of said data received from one of said equipment and said centralized control apparatus, wherein communication of the stored data to said centralized control apparatus is initiated after an operation of said equipment is terminated, when the request for the transmission of said data is received during the operation of said equipment.

8. A method according to claim 7, wherein said data is allowed to be transmitted after a passage of a predetermined period of time since the termination of the operation of said equipment in the initiating step.

9. A method according to claim 8, wherein said equipment is a recording apparatus for recording an image on a recording medium, said equipment being capable of causing said data to be transmitted after the passage of a predetermined period of time since the termination of the recording operation.

10. A method of controlling communication between equipment and a centralized control apparatus located at a position apart from said equipment through a communication line, said method comprising the steps of:

storing data indicative of a state of the equipment;

communicating said data with said centralized control apparatus;

detecting a frequency of abnormality occurrences in said equipment; and initiating communication of the stored data to said centralized control apparatus at time intervals of a predetermined period, wherein, in the initiating step, the time intervals for initiating communication of said data are modified in accordance with detection results of said detecting step.

11. A method according to claim 10, wherein said time intervals are shortened when abnormality often occurs in the initiating step.

12. A method according to claim 10, wherein said equipment is a recording apparatus for recording an image on a recording medium.

13. An equipment controlling method comprising the steps of:

storing common data indicating a state of an equipment, which are common to different kinds of equipment, and specific data indicating the state of the equipment, which are not common and cannot be used by the different kinds of equipment from said equipment;

communicating with a centralized control apparatus which controls said common data and said specific data intensively through a communication line; and discriminating said common data and said specific data and causing them to be transmitted to said centralized control apparatus through the communication line.

14. A method according to claim 13, wherein in said storing step, said common data and said specific data are separately stored in addresses, and the addresses for storing said common data are a common area for each equipment irrespective of kinds of the equipment.

15. A method according to claim 13, wherein in said discriminating step, relative address from head of data is caused to be transmitted.

16. An equipment controlling method comprising the steps of:

storing data indicating a state of an equipment;

communicating with a first and second centralized control apparatus for controlling said data intensively through a communication line; and executing controls so that when no communication is possible with said first centralized control apparatus, communication is performed with said second centralized control apparatus.

17. A method according to claim 16, wherein in said executing step, communicating with said second centralized control apparatus is attempted when communication with said first centralized control apparatus is not possible after communication has been attempted for a predetermined number of times.

18. A method according to claim 16, wherein when no communication with said first centralized control apparatus is possible after communication has been attempted for a predetermined number of times, communication with said first centralized control apparatus is not performed thereafter in the executing step.

19. An equipment controlling method of controlling communication between an image formation apparatus for recording an image on a recording medium and an external apparatus located at a position apart from an equipment controlling apparatus and said image formation apparatus through a communication line, said method comprising the steps of:

storing data indicative of a state of the image formation apparatus;

communicating with the external apparatus; and instructing transmission of the stored data to said external apparatus, wherein said data comprise a date and time of a defective feeding of the recording medium, a total counting value of image formations at the time of the defective feeding, and a kind of the defective feeding.

20. A method according to claim 19, wherein in the instructing step, its instruction is issued when an abnormality occurs in said image formation apparatus.

21. A method according to claim 19, wherein in the instructing step, its instruction is issued at a predetermined time.

22. A method according to claim 19, wherein in the instructing step, instruction is issued after a predetermined number of image recordings are performed by said image formation apparatus.

23. A method according to claim 19, wherein in the instructing step, instruction is issued when trouble occurs in said image formation apparatus with respect to said recording medium.

24. A method according to claim 19, wherein in the instructing step, instruction is issued when expendables consumed by said image formation apparatus are exhausted.

25. A method according to claim 19, wherein in the instructing step, instruction is issued when a counter value equals a predetermined value.

26. An equipment controlling method of controlling communication between an image formation apparatus for recording an image on a recording medium and an external apparatus located at a position apart from an equipment controlling apparatus and said image formation apparatus through a communication line, said method comprising the steps of:

storing data indicative of a state of the image formation apparatus;

communicating with the external apparatus; and instructing transmission of the stored data to said external apparatus, wherein said data comprise a date and time of abnormal control of image formation, a total counting value of image formations at the time of the abnormal control, and a kind of the abnormal control.

27. A method according to claim 26, wherein in said instructing step, instruction is issued when an abnormality occurs in said image formation apparatus.

28. A method according to claim 26, wherein in said instructing step, instruction is issued at a predetermined time.

29. A method according to claim 26, wherein in said instructing step, instruction is issued after a predetermined number of image recordings are performed by said image formation apparatus.

30. A method according to claim 26, wherein in said instructing step, instruction is issued when an abnormality occurs in said image formation apparatus with respect to said recording medium.

31. A method according to claim 26, wherein in the instructing step, instruction is issued when expendables consumed by said image formation apparatus are exhausted.

32. A method according to claim 26, wherein in the instructing step, instruction is issued when a counter value equals a predetermined value.

33. An equipment controlling method of controlling communication between an image forming apparatus for recording an image on a recording medium and an external apparatus located at a position apart from an equipment controlling apparatus and said image formation apparatus through a communication line, said method comprising the steps of:

storing data indicative of a state of the image formation apparatus;

communicating with the external apparatus; and instructing transmission of the stored data to said external apparatus when a counter value equals a predetermined value, wherein said data comprise a date and time of transmission of the stored data to said external apparatus in said communicating step.

34. A method of controlling communication between an equipment and a centralized control apparatus located at a position apart from the equipment through a communication line, said method comprising the steps of:

communicating data indicative of a state of the equipment with the centralized control apparatus; and initiating communication of the data in said communicating step to said centralized control apparatus, communication of the data being initiated in accordance with a predetermined condition corresponding to a type of the data, in said initiating step.

35. A method of controlling communication between an equipment and a centralized control apparatus located at a position apart from the equipment through a communication line, said method comprising the steps of:

communicating data indicative of a state of the equipment with the centralized control apparatus; and initiating communication of the data in said communicating step to the centralized control apparatus in response to a request for transmission of the data received from one of the equipment and the centralized control apparatus, communication of the data to the centralized control apparatus being initiated in the initiating step if an operation of the equipment is not started during a predetermined time period after the request for the transmission of the data.

36. A method of controlling communication between an equipment and a centralized control apparatus located at a position apart from the equipment through a communication line, said method comprising the steps of:

communicating data indicative of a state of the equipment with the centralized control apparatus; and detecting a frequency of abnormality occurrences in said equipment; and initiating communication of the data in said communicating step to the centralized control apparatus, communication of the data being initiated in accordance with detection results of the detecting means, in said initiating step.

37. A method of controlling communication between an equipment and a centralized control apparatus located at a position apart from the equipment through a communication line, said method comprising the steps of:

communicating data indicative of a state of the equipment with the centralized control apparatus; and detecting a frequency of abnormality occurrences in said equipment; and initiating communication of the data in said communicating step to the centralized control apparatus in accordance with a predetermined condition, said predetermined condition being modified in accordance with detection results of said detecting step, in the initiating step.

38. A method of controlling communication between an equipment and a centralized control apparatus located at a position apart from the equipment through a communication line, said method comprising the steps of:

communicating data indicative of a state of the equipment with the centralized control apparatus; and initiating communication of the data in said communicating step to the centralized control apparatus a predetermined number of times, in said initiating step, said communicating step is controlled so that, when communication is unsuccessful during the predetermined number of times of initiation, communication is again initiated the predetermined number of times.

39. A method of controlling communication between an image formation apparatus for recording an image on a recording medium and a centralized control apparatus located at a position apart from the equipment through a communication line, said method comprising the steps of:

communicating data indicative of a state of the image formation apparatus with the centralized control apparatus; and initiating communication of the data in said communicating step to said centralized control apparatus, wherein the data comprise a total count value of image formation operations at the time of a control abnormality in the image formation apparatus in combination with a type of the control abnormality.

* * * * *

UNITED STATES PATENT AND TRADEMARK OFFICE
CERTIFICATE OF CORRECTION

PATENT NO. : 5,493,364

DATED : February 20, 1996

INVENTOR(S) : Kuroyanagi et al.

It is certified that error appears in the above-indentified patent and that said Letters Patent is hereby corrected as shown below:

On title page, item
[56] References Cited:

OTHER PUBLICATIONS

"19896" should read --1986--.

COLUMN 1:

Line 40, "data" should be deleted.

COLUMN 2:

Line 22, "become" should read --become a--;
Line 29, "soft ware" should read --software--;
Line 40, "at" should read --by--;
Line 41, "by" should read --at--; and
Line 63, "titus" should read --thus--.

COLUMN 3:

Line 29, "is" should be deleted;
Line 33, "dose" should read --does--; and
Line 59, "soft ware" should read --software--.

COLUMN 4:

Line 56, "s" should be deleted;
Line 61, "is" should be deleted; and
Line 66, "s" should be deleted.

UNITED STATES PATENT AND TRADEMARK OFFICE
CERTIFICATE OF CORRECTION

PATENT NO. : 5,493,364
DATED : February 20, 1996
INVENTOR(S) : Kuroyanagi et al.

It is certified that error appears in the above-indentified patent and that said Letters Patent is hereby corrected as shown below:

COLUMN 5:

Line 7, "ms" should read --is--; and
  Line 46, "a" should read --an--, and "lime" should read --like--.

COLUMN 6:

Line 24, "numeral 802" should read --numeral 804--; and
  Line 41, "control" should read --controls--.

COLUMN 7:

Line 25, "a" should read --an--;
  Line 26, "lamp 703" should read --lamp 103--;
  Line 29, "motor 102," should read --motor 104,--; and
  Line 50, "cassette 114," should read --cassette 114 or--.

COLUMN 8:

Line 27, "pass 128 in" should read --pass 128. In--;
  Line 40, "traling" should read --trailing--; and
  Line 50, "a" should read --an--.

COLUMN 9:

Line 19, "she" should read --the--.

UNITED STATES PATENT AND TRADEMARK OFFICE
CERTIFICATE OF CORRECTION

PATENT NO. 5,493,364  Page 3 of 5
DATED  February 20, 1996
INVENTOR(S) Kuroyanagi et al.

It is certified that error appears in the above-indentified patent and that said Letters Patent is hereby corrected as shown below:

COLUMN 10:

Line 1, "lo" should be deleted;
Line 12, "such" should read --such as--;
Line 14, "numeral 702" should read --numeral 704--; and
Line 39, "s" should be deleted.

COLUMN 11:

Line 38, "o" should be deleted.

COLUMN 13:

Line 19, "are" should read --and--, and "and" should read --are--;
Line 24, "o" should be deleted; and
Line 66, "step S113" should read --step 113--.

COLUMN 15:

Line 31, "periodical communication" should read --periodic communication,--.

COLUMN 18:

Line 21, "Jam" should read --jam--;
Line 50, "contens" should read --contents--; and
Line 51, "operates" should read --performs--.

UNITED STATES PATENT AND TRADEMARK OFFICE
CERTIFICATE OF CORRECTION

PATENT NO. : 5,493,364
DATED : February 20, 1996
INVENTOR(S) : Kuroyanagi et al.

It is certified that error appears in the above-indentified patent and that said Letters Patent is hereby corrected as shown below:

COLUMN 21:

Line 42, "th" should read --the--.

COLUMN 22:

Line 29, "She" should read --the--; and
Line 41, "means" should read --means,--.

COLUMN 23:

Line 4, "step S30h" should read --step S304--;
Line 7, "results," should read --result,--;
Line 30, "Jamming" should read --jamming--;
Line 31, "Jamming" should read --jamming--; and
Line 44, "an" should be deleted.

COLUMN 24:

Line 28, "controller" should read --controller 900,--; and
Line 40, "S342). The" should read --S342), the--.

UNITED STATES PATENT AND TRADEMARK OFFICE
CERTIFICATE OF CORRECTION

PATENT NO. : 5,493,364
DATED : February 20, 1996
INVENTOR(S) : Kuroyanagi et al.

It is certified that error appears in the above-indentified patent and that said Letters Patent is hereby corrected as shown below:

<u>COLUMN 25</u>:

Line 35, "operates" should read --performs--.

<u>COLUMN 26</u>:

Line 14, "method" should read --apparatus--.

Signed and Sealed this

Twelfth Day of November, 1996

*Attest:*

BRUCE LEHMAN

*Attesting Officer*  *Commissioner of Patents and Trademarks*